(12) United States Patent  
Yin et al.

(10) Patent No.: US 9,319,188 B2
(45) Date of Patent: Apr. 19, 2016

(54) SYSTEMS AND METHODS FOR SPECIAL SUBFRAME CONFIGURATION FOR CARRIER AGGREGATION

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 531 days.

(21) Appl. No.: 13/744,387

(22) Filed: Jan. 17, 2013

(65) Prior Publication Data

US 2014/0198773 A1     Jul. 17, 2014

(51) Int. Cl.
*H04W 72/04* (2009.01)
*H04L 5/00* (2006.01)
*H04L 5/14* (2006.01)

(52) U.S. Cl.
CPC .............. *H04L 5/001* (2013.01); *H04L 5/0048* (2013.01); *H04L 5/1469* (2013.01)

(58) Field of Classification Search
CPC ..... H04L 5/001; H04L 5/1469; H04L 5/0048; H04W 72/04
See application file for complete search history.

(56) References Cited

U.S. PATENT DOCUMENTS

| 2011/0176461 | A1  | 7/2011 | Astely et al. |
| 2013/0083706 | A1* | 4/2013 | Lin ........................ H04L 5/14 370/280 |
| 2013/0176953 | A1* | 7/2013 | Stern-Berkowitz . H04W 52/146 370/329 |

FOREIGN PATENT DOCUMENTS

| EP | 2195987 | 6/2010 |
| EP | 2392183 | 12/2011 |
| EP | 2517379 | 10/2012 |

OTHER PUBLICATIONS

3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, Evolved Universal Terrestrial Radio Access (E-UTRA); Physical layer procedures (Release 8), Mar. 2009.
3GPP TSG RAN WG1 "Draft Report of 3GPP TSG RAN WG1 #71 v0.1.0 Meeting #72" R1-130001, Saint Julian's, MALTA, Jan. 28-Feb. 1, 2013.

\* cited by examiner

*Primary Examiner* — Melvin Marcelo
*Assistant Examiner* — Gbemileke Onamuti
(74) *Attorney, Agent, or Firm* — Austin Rapp & Hardman

(57) ABSTRACT

A user equipment (UE) for special subframe configuration for carrier aggregation is described. The UE includes a processor and memory in electronic communication with the processor. Executable instructions are stored in the memory. The UE transmits and receives based on the special subframe configuration, regardless of a combination of special subframe configurations of the aggregated cells.

6 Claims, 17 Drawing Sheets

SYSTEMS AND METHODS FOR SPECIAL SUBFRAME CONFIGURATION FOR CARRIER AGGREGATION

TECHNICAL FIELD

The present disclosure relates generally to communication systems. More specifically, the present disclosure relates to systems and methods for special subframe configuration for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
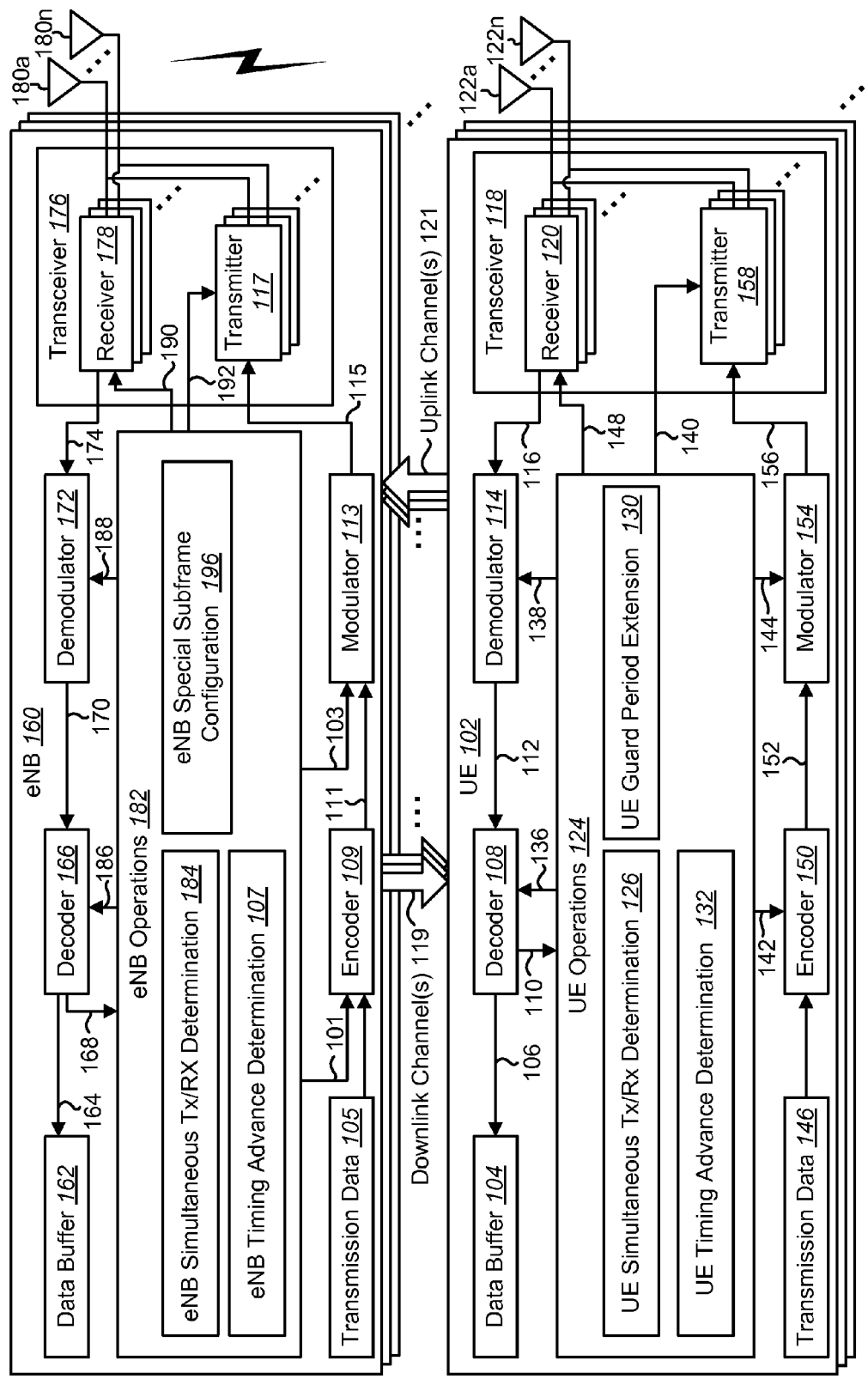
FIG. 1 is a block diagram illustrating one configuration of one or more evolved Node Bs (eNBs) and one or more User Equipments (UEs) in which systems and methods for special subframe configuration for carrier aggregation may be implemented.

A user equipment (UE) for special subframe configuration for carrier aggregation is described. The UE includes a processor and memory in electronic communication with the processor. The instructions are executable to transmit and receive based on a special subframe configuration, regardless of a combination of special subframe configurations of the aggregated cells.

The instructions may be further executable to determine whether the UE is capable of simultaneous reception and transmission in the aggregated cells and transmitting and receiving may be performed if the UE is capable of simultaneous reception and transmission.

Transmitting and receiving may be performed regardless of a conflict region resulting from the combination of special subframe configurations. The instructions may be further executable to support any combination of special subframe configurations.

An evolved Node B (eNB) for special subframe configuration for carrier aggregation is described. The eNB includes a processor and memory in electronic communication with the processor. Instructions stored in the memory are executable to determine whether a UE is capable of simultaneous reception and transmission in aggregated cells. The instructions are further executable to determine a timing advance of each aggregated cell. The instructions are also executable to determine a special subframe configuration for the aggregated cells based on whether a UE is capable of simultaneous reception and transmission and at least one timing advance. The instructions are also executable to transmit and receive on at least one of the aggregated cells based on the determined special subframe configuration.

The instructions may be further executable to obtain the special subframe configuration. If the UE is capable of simultaneous reception and transmission in the aggregated cells, transmitting and receiving may be performed regardless of a conflict region resulting from the combination of special subframe configurations.

Another UE for special subframe configuration for carrier aggregation is described. The UE includes a processor and memory in electronic communication with the processor. The instructions are also executable to extend a guard period on at least one cell wherein the UE is not capable of simultaneous reception and transmission in aggregated cells. The instructions may be executable to determine whether the UE is capable of simultaneous reception and transmission in the aggregated cells.

Extending the guard period may include not receiving a last portion of a downlink pilot time slot of any cell that overlaps with any uplink pilot time slot of another cell. Extending the guard period may include extending the guard period such that an effective guard period has an overlap that is greater than a sum of a cell switching time and a processing time. The instructions may be further executable to determine a timing advance for each of the aggregated cells. Extending the guard period may include extending the guard period such that the guard period is greater than a maximum timing advance of at least one cell, a maximum propagation delay of at least one cell, a maximum cell switching period of at least one cell and a maximum processing time of at least one cell.

If the aggregated cells implement multiple uplink-downlink configurations, the instructions may be further executable to assume that the guard period in the aggregated cells has an overlap of at least $1456 \cdot T_S$ if the UE is not capable of simultaneous reception and transmission in the aggregated cells $T_S$ may be a time unit. If the aggregated cells implement multiple uplink-downlink configurations, the instructions may be further executable to assume that the guard period in the aggregated cells has an overlap that is greater than a sum of a cell switching time and a processing time if the UE is not capable of simultaneous reception and transmission in the aggregated cells. If the aggregated cells implement multiple uplink-downlink configurations, the instructions may be further executable to assume that the guard period is extended by not receiving a last portion of a downlink pilot time slot of any cell that overlaps with any uplink pilot time slot of another cell.

The aggregated cells may implement multiple uplink-downlink configurations. The instructions may be further executable to assume that the guard period is extended based on a type of a serving cell. The UE may not receive one or more of a physical downlink shared channel (PDSCH), an enhanced physical downlink control channel (EPDCCH), a physical multicast channel (PMCH) and a positioning reference signal (PRS) transmission on a secondary cell in a subframe, the UE may not receive any other signals on the secondary cell in orthogonal frequency-division multiplexing (OFDM) symbols that overlap with the guard period or an uplink pilot time slot (UpPTS) in a primary cell and the UE may not transmit any signal on the secondary cell in OFDM symbols that overlap with a downlink pilot time slot (DwPTS) in the primary cell.

Another eNB for special subframe configuration for carrier aggregation is described. The eNB includes a processor and memory in electronic communication with the processor. The instructions stored in the memory are executable to determine whether a UE is capable of simultaneous reception and transmission in aggregated cells. The instructions are also executable to jointly determine the special subframe configurations of the aggregated cells.

A guard period may be extended on at least one of the aggregated cells if there are UEs that are not capable of simultaneous reception and transmission in the aggregated cells. The guard period may be extended such that the guard period has an overlap that is greater than a sum of a cell switching time and a processing time. The guard period may be extended such that an effective guard period has an overlap that is greater than a sum of a cell switching time and a processing time.

The instructions may be further executable to determine a timing advance for each of the aggregated cells. Extending the guard period may include extending the guard period such that the guard period is greater than a maximum timing advance of at least one cell, a maximum propagation delay of at least one cell, a maximum cell switching period of at least one cell and a maximum processing time of at least one cell.

Another eNB for special subframe configuration for carrier aggregation is described. The eNB includes a processor and memory in electronic communication with the processor. The instructions stored in the memory are executable to determine whether a UE is capable of simultaneous reception and transmission in aggregated cells. The instructions are also executable to determine a special subframe configuration for each individual cell independently if there are UEs that are not capable of simultaneous reception and transmission in the aggregated cells.

A method for special subframe configuration for carrier aggregation by a UE is described. The method includes transmitting and receiving based on a special subframe configuration, regardless of a combination of special subframe configurations of the aggregated cells.

A method for special subframe configuration for carrier aggregation by an eNB is described. The method includes determining whether a UE is capable of simultaneous reception and transmission in aggregated cells. The method also includes determining a timing advance of each aggregated cell. The method further includes determining a special subframe configuration for the aggregated cells based on whether a UE is capable of simultaneous reception and transmission and at least one timing advance. The method also includes transmitting and receiving on at least one of the aggregated cells based on the determined special subframe configuration.

Another method for special subframe configuration for carrier aggregation by a UE is described. The method includes extending a guard period on at least one cell, wherein the UE is not capable of simultaneous reception and transmission in the aggregated cells.

Another method for special subframe configuration for carrier aggregation by an eNB is described. The method includes determining whether a UE is capable of simultaneous reception and transmission in aggregated cells. The method also includes jointly determining the special subframe configurations of the aggregated cells.

Another method for special subframe configuration for carrier aggregation by an eNB is described. The method includes determining whether a UE is capable of simultaneous reception and transmission in aggregated cells. The method also includes determining the special subframe configurations for each individual cell independently if there are UEs that are not capable of simultaneous reception and transmission in the aggregated cells.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe special subframe configuration for carrier aggregation. In some configurations, a UE may be configured with multiple frame structure type 2 cells, e.g., time-division duplex (TDD) carrier aggregation (CA).

In LTE Release 10 (Rel-10), the same TDD uplink-downlink (UL-DL) configuration may be used in the TDD cells. A special subframe may be used to switch from a downlink transmission to an uplink transmission. There may be several different special subframe configurations as defined in 3GPP TS 36.211.

In some implementations, during TDD carrier aggregation, in case multiple cells are aggregated, the UE may assume that the guard period of the special subframe in the different cells have an overlap of at least $1456 \cdot T_S$ for carrier aggregation with the same TDD configuration and a single timing advance on all aggregated cells, where $T_S$ is a time unit equal to $$\frac{1}{(15000 \times 2048)}$$

seconds. In some implementations, a half-duplex operation may be assumed, thus the overlap of at least $1456 \cdot T_S$ between the guard period of the special subframe in the different cells may satisfy the required time for switching between cells.

The overlap of at least $1456 \cdot T_S$ may be specified to prevent conflicting regions between the downlink pilot time slot (DwPTS) of the cells and the uplink pilot time slot (UpPTS) of the cells. In this implementation, some special subframe combinations may not be supported (special subframe configurations 4 and 8, for example) on different cells in TDD carrier aggregation. A guard period length of $1456 \cdot T_S$, may be used in special subframe configuration 8 when the DwPTS uses normal cyclic prefix (CP) and when the UpPTS uses extended cyclic prefix. From another point of view, the $1456 \cdot T_S$ overlapping guard period length may be viewed as a guard period length for a downlink to uplink switch and a cell switch among aggregated cells.

In LTE release 11 (Rel-11), inter-band TDD carrier aggregation with different TDD uplink-downlink configurations may be supported as a mandatory feature. Furthermore, simultaneous reception and transmission on inter-band TDD carrier aggregation and multiple timing advance unit groups (TAGs) may be defined as UE capabilities by the fields of simultaneousRx-Tx and multipleTimingAdvance. For example, the simultaneousRx-Tx field may define whether the UE supports simultaneous reception and transmission for inter-band TDD carrier aggregation. The multipleTimingAdvance field may define whether multiple timing advances are supported for each band combination supported by the UE. As a result, a restriction on special subframe configuration in TDD carrier aggregation may not be valid. Furthermore, the minimum overlap may not solve all issues in half-duplex operations.

The systems and methods disclosed herein may provide a TDD special subframe configuration (e.g., setting and constraints) for LTE UEs based on the UE capabilities of simultaneous reception and transmission (as indicated in the simultaneousRx-Tx field, for example) in cases where multiple TDD cells are aggregated. For example, if the UE is capable of simultaneous reception and transmission in the aggregated cells (e.g., simultaneousRx-Tx={supported} in the band combination for the aggregated cells) and the UE can transmit on one cell and receive at the other cell simultaneously, no restriction may be needed for the special subframe structure. By comparison, if the UE is not capable of simultaneous reception and transmission in the aggregated cells (e.g., simultaneousRx-Tx=N/A in the band combination for the aggregated cells), the UE may operate in a half-duplex manner and may not transmit on one cell and receive on another cell simultaneously in a subframe. The systems and methods disclosed herein may provide for different special subframe configurations in the primary cell (PCell) and at least one secondary cell (SCell(s)).

According to one implementation, the UE may assume there is no overlap between the DwPTS and UpPTS of any cells. Considering multiple time advance support, a required guard period may be different. This leaves the task to an eNB implementation to guarantee a no conflict region between a downlink transmission and an uplink transmission. In some implementations, the eNB may have to consider all UEs in the cells to determine the special subframe configuration of each cell and to avoid an overlap between the DwPTS and UpPTS transmissions and receptions in all cells. Accordingly, the special subframe configuration of each cell may not be optimized for the given cell.

In some implementations, the UE behavior may be defined for both single timing advances and multiple timing advances (MTAs) cases. If the UpPTS transmission in one cell overlaps with the DwPTS reception of another cell, the UE may assume the guard period is extended, for example, by not receiving the last part of the DwPTS of the other cell.

The methods and systems disclosed herein may be beneficial by defining the conditions and restrictions of special subframe configurations for TDD carrier aggregation. Additionally, removing restrictions for UEs that support simultaneous reception and transmission may be beneficial. For UEs that do not support simultaneous reception and transmission, the systems and methods disclosed herein may be beneficial as assumptions may be specified and handling methods may be introduced. Additionally, with the proposed UE behavior, the eNB may optimize the special subframe configuration of each cell.

In some implementations, an eNB may configure a special subframe of aggregated cells jointly. For example, the eNB may consider the timing advance (TA) values of all cells such that there will be no conflict for any configured UEs with carrier aggregation. Alternatively, the eNB may configure and optimize the special subframe configuration of a cell independently. In this case, collision (e.g., overlapping region) handling may be addressed by UE behavior.

In some implementations, in a case where multiple cells are aggregated and the UE may support any combination of special subframe configurations (if the UE is capable of simultaneous reception and transmission in the aggregated cells, for example). However, in a case multiple cells are aggregated and the UE is not capable of simultaneous reception and transmission in the aggregated cells, one or more approaches may be utilized. In one approach, the UE may assume that the guard period of the special subframe in the different cells have an overlap of at least $1456 \cdot T_S$. In another approach, the UE may assume that the effective guard period of the special subframe in the different cells have an overlap at least the cell switching and process time (e.g., $1456 \cdot T_S$). In yet another approach, the UE may assume that the guard period of a cell may be extended by not receiving the last part of DwPTS of the cell that overlaps with the UpPTS transmission of another cell.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed but is merely representative of the systems and methods.

FIG. 1 is a block diagram illustrating one configuration of one or more eNBs 160 and one or more UEs 102 in which systems and methods for special subframe configuration for carrier aggregation may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE simultaneous transmit and receive (Tx/Rx) determination module 126. Optionally, the UE operations module 124 may include one or more of a UE guard period extension module 130 and a UE timing advance determination module 132.

In some implementations, whether a UE is capable or is not capable of simultaneous reception and transmission may be determined at the time of manufacturing. In this implementation, there would not be determination step in the stored memory. One the other hand, in some implementations, some UEs 102 may have a determination step because of different combination of aggregated cells. In an implementation where the UE 102 may have to determine whether a UE 102 is capable of simultaneous transmission and reception, the UE simultaneous Tx/Rx determination module 126 may determine whether a UE 102 is capable (or not capable) of simultaneously transmitting and receiving information. In other words, the UE simultaneous Tx/Rx determination module 126 may determine that a UE 102 can (or cannot) transmit on one cell and receive on another cell simultaneously. For example, the UE simultaneous Tx/Rx determination module 126 may determine whether the UE 102 is a full-duplex capable UE 102 or a half-duplex capable UE 102.

The UE 102 may pass information onto one or more eNBs 160. For example, the UE 102 may indicate to the eNB 160 that the UE 102 is capable (or not) of simultaneous transmission and reception. Based on this information, the eNB 160 may perform one or more operations with regard to a special subframe configuration (e.g., extend a guard period). In some implementations, the UE 102 may indicate to the eNB 160 that the UE 102 is capable (or not) of simultaneous transmission and reception via an indicator field, for example, a simultaneousRx-Tx field. According to these implementations, a value of "supported" in the simultaneousRx-Tx field may indicate that the UE 102 is capable of supporting simultaneous transmission and reception. By comparison, a value of "N/A" in the simultaneousRx-Tx field may indicate that the UE 102 is not capable of supporting simultaneous transmission and reception.

Determining whether a UE 102 is capable of simultaneous transmission and reception may be beneficial in that a more complete utilization of a channel may be realized. For example, if a UE 102 is a full-duplex capable UE 102, the special subframe may be configured to increase transmission efficiency.

The UE guard period extension module 130 may extend the guard period of the special subframe. In some implementations, the UE guard period extension module 130 may assume a guard period extension (in cases where the UE 102 is not capable of simultaneous transmission and reception, for instance). For example, the UE guard period extension module 130 may determine a guard period extension based on a combination of special subframe configurations (as described in greater detail below). In other implementations, the UE guard period extension module 130 may extend the guard period based on received information. For example, a UE 102 may indicate to the eNB 160 whether it is capable of simultaneous reception and transmission. Based on this information, the eNB 160 may determine whether to extend the guard period based on that information. The eNB 160 may then direct the UE 102 to extend (or avoid extending) the guard period. In this example, the UE guard period extension module 130 may then extend (or avoid extending) the guard period based on the direction sent by the eNB 160.

The UE guard period extension module 130 may extend the guard period of the special subframe based on a duplexing mode of the UE 102. For example, if the UE 102 is not capable of simultaneous transmission and reception, the UE guard period extension module 130 may extend the guard period. As will be described below, in some implementations, the UE guard period extension 130 may extend the guard period by ignoring a portion (e.g., the last portion) of the DwPTS. By comparison, if the UE 102 is capable of simultaneous transmission and reception, the UE guard period extension module 130 may avoid extending the guard period.

The UE guard period extension module 130 may extend the guard period to one or more amounts. For example, the UE guard period extension module 130 may extend the guard period such that an overlap of the guard periods of the cells is greater than a set amount (e.g., $1456 \cdot T_S$, for example). In some examples, the UE guard period extension module 130 may extend the guard period such that an overlap of the guard periods of the cells is greater than a cell switching time and a processing time for a UE 102. As will be described below, the UE guard period extension module 130 may extend the guard period based on one or more timing advances of the cells. Extending the guard period may be beneficial in that it decreases a likelihood of a conflict between a DwPTS reception of a cell and a UpPTS transmission of another cell.

The UE timing advance determination module 132 may determine one or more timing advances of the cells. In some implementations, the UE timing advance determination module 132 may pass information to the eNB 160. In this example, the eNB 160 may then process a special subframe based on the timing advance (by extending the guard period, for example).

In some implementations, the UE timing advance determination module 132 may determine whether the UE 102 is capable of supporting multiple timing advances. In some implementations, supporting multiple timing advances may include supporting different timing advances. For example, a first cell may have a first timing advance that is a first length and a second cell may have a second timing advance that is a second length.

In some implementations, the UE timing advance determination module 132 may pass information. For example, the UE timing advance determination module 132 may indicate to the eNB 160 that the UE 102 supports multiple timing advances. In some configurations, the UE 102 may pass information about whether the UE 102 is capable of supporting multiple timing advances via an indicator field. For example, a multipleTimingAdvance field may indicate whether a UE 102 may support multiple timing advances. In this example, the eNB 160 may extend the guard period based on this information.

The UE operations module 124 may provide information 148 to the one or more receivers 120. For example, the UE operations module 124 may inform the receiver(s) 120 when to receive transmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data.

In general, the eNB operations module 182 may enable the eNB 160 to communicate with the one or more UEs 102. The eNB operations module 182 may include an eNB simultaneous transmit and receive (Tx/RX) determination module 184. Optionally, the eNB operations module 182 may include one or more of an eNB special subframe configuration module 196 and an eNB timing advance determination module 107. It should be noted that the eNB may not need to consider the guard period extension. The guard period extension may be a UE 102 issue to adjust TA such that the uplink signals arrive at the eNB 160 in a synchronized manner. The eNB 160 may transmit and receive based on the subframe timing. For example, the propagation delay and TA may be issues addressed or handled by the UE 102.

The eNB simultaneous Tx/Rx determination module 184 may determine whether a UE 102 is capable (or not capable) of simultaneously transmitting and receiving information. In other words, the eNB simultaneous Tx/Rx determination module 184 may determine that a UE 102 can (or cannot) transmit on one cell and receive at another cell simultaneously. For example, the eNB simultaneous Tx/Rx determination module 184 may determine whether a UE 102 is a full-duplex capable UE 102 or a half-duplex capable UE 102.

In some implementations, the eNB simultaneous Tx/Rx determination module 184 may determine whether a UE is capable of simultaneously transmitting and receiving information based on received information (e.g., a simultaneousRx-Tx field). According to these implementations, a value of "supported" in the simultaneousRx-Tx field may indicate that the UE 102 is capable of supporting simultaneous transmission and reception. By comparison, a value of "N/A" in the simultaneousRx-Tx field may indicate that the UE 102 is not capable of supporting simultaneous transmission and reception. Determining whether a UE 102 is capable of simultaneous transmission and reception may be beneficial in that a more complete channel utilization may be realized as described above.

The eNB special subframe configuration module 196 may configure the special subframe of one or more cells. In some implementations, the eNB special subframe configuration module 196 may configure the special subframe configuration of one or more (e.g., all) aggregated cells based on cell coverage and the maximum timing advance values (selected from among the aggregated cells, for example) so that there may be no overlapping of DwPTS reception and UpPTS transmission of any cells. In some implementations, the UE(s) 102 may follow the eNB configurations and no special handling may be needed.

The eNB special subframe configuration module 196 may configure the special subframe configuration of one or more (e.g., all) aggregated cells based on cell coverage and the maximum timing advance values (selected from the aggregated cells, for example). For example, the eNB special subframe configuration module 196 may configure the special subframe of one or more (e.g., all) aggregated cells such that an overlap of the guard periods of the cells is greater than a set amount (e.g., $1456 \cdot T_S$, for example). In some examples, the eNB special subframe configuration module 196 may configure the special subframe of one or more (e.g., all) aggregated cells such that an overlap of the guard periods of the cells is greater than a cell switching time and a processing time for a UE 102. As will be described below, the eNB special subframe configuration module 196 may configure the special subframe configuration of one or more (e.g., all) aggregated cells based on one or more timing advances of the cells. Jointly configuring the special subframe configurations of all aggregated cells may be beneficial in that it decreases a likelihood of a conflict between a DwPTS reception of one cell and a UpPTS transmission of another cell.

The eNB special subframe configuration module 196 may configure the special subframe of a cell to a configuration that may be optimized to the cell coverage of the cell. For a UE 102 that is not capable of simultaneous reception and transmission, the UE 102 behavior of guard period extension may be used for the possible overlapping of DwPTS reception and UpPTS transmission. As will be described below, in some implementations, the UE 102 may extend the guard period by ignoring a portion (e.g., the last portion) of the DwPTS.

The eNB timing advance determination module 107 may determine one or more timing advances of the cells. In some implementations, the eNB timing advance determination module 107 may receive information from the UE 102. For example, the eNB 160 may receive information from the UE 102 indicating the timing advances of the cells. In this example, the eNB 160 may then process a special subframe based on the timing advance. The eNB timing advance determination module 107 may determine the maximum timing advance of a cell based on the cell planning and coverage. The eNB timing advance determination module 107 may determine the maximum timing advance of a cell based on the maximum timing advance value of all UE(s) 102 associated with the cell.

In some implementations, the eNB timing advance determination module 107 may determine whether the UE 102 is capable of supporting multiple timing advances. In some implementations, supporting multiple timing advances may include supporting different timing advances. For example, a first cell may have a first timing advance that is a first length and a second cell may have a second timing advance that is a second length.

In some implementations, the eNB timing advance determination module 107 may receive information. For example, the eNB timing advance determination module 107 may receive information from the UE 102 that indicates whether the UE 102 supports multiple timing advances. In some implementations, the eNB timing advance determination module 107 may receive information via an indicator field. For example, a multipleTimingAdvance field may indicate whether a UE 102 may support multiple timing advances. In this example, the eNB 160 may determine a guard period (e.g., a required guard period) and may select a special subframe configuration for a cell based on this information. For example, if the eNB 160 receives information that the UE 102 does support multiple timing advances, the eNB 160 may determine a guard period and select a special subframe configuration for a cell such that an effective guard period is at least greater than a cell switching and processing time. As will be described below, the effective guard period may be the guard period less a timing advance and a propagation delay (which may have the same value of the timing advance).

The eNB operations module 182 may provide information 190 to the one or more receivers 178. The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117.

For example, the eNB operations module 182 may instruct the one or more transmitters 117 when to (or when not to) transmit a signal to the UE(s) 102. In some implementations, this may be based on an UL-DL configuration. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
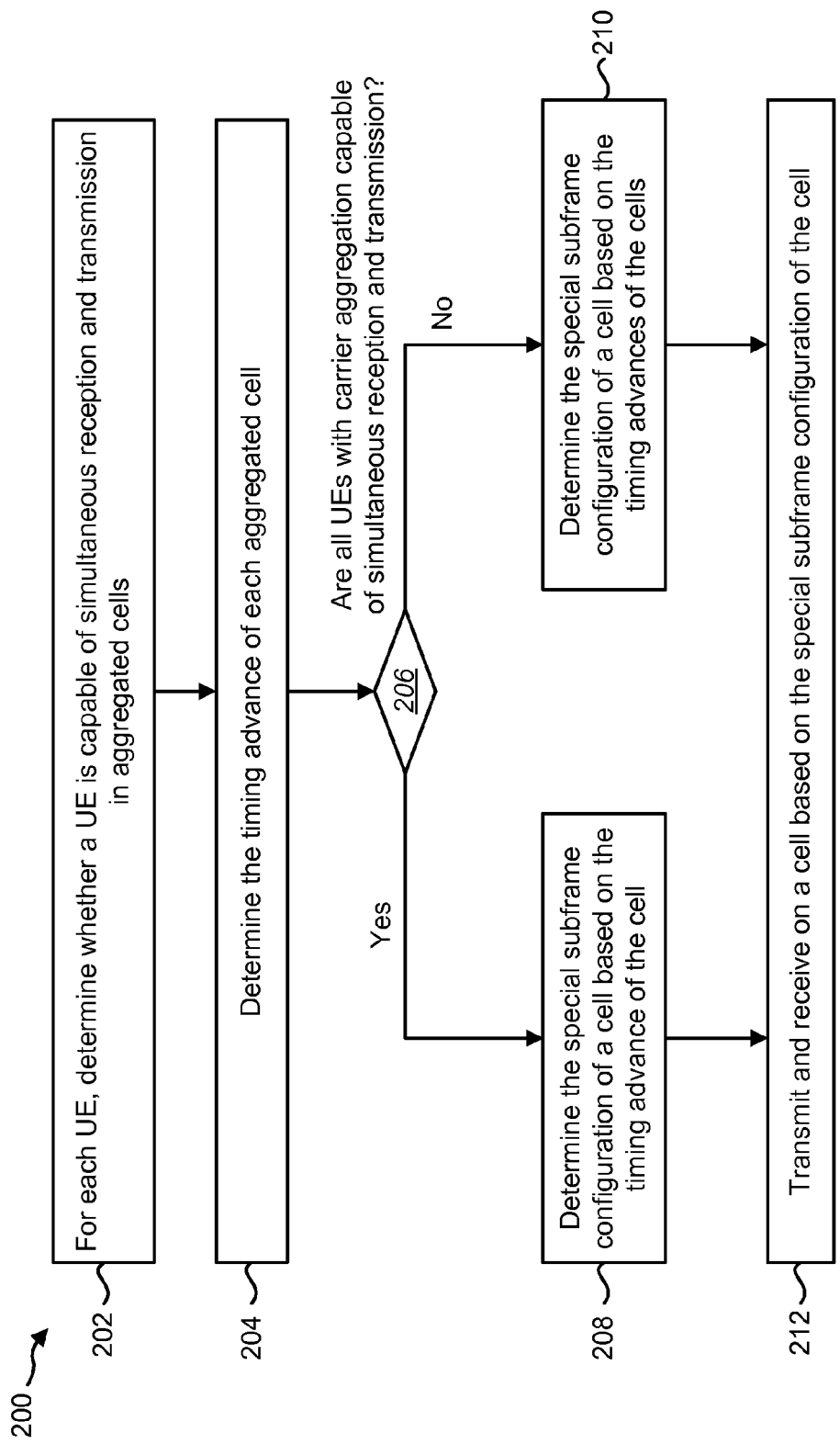
FIG. 2 is a flow diagram illustrating one implementation of a method for performing special subframe configuration for carrier aggregation by an eNB.

FIG. 2 is a flow diagram illustrating one implementation of a method 200 for performing special subframe configuration for carrier aggregation by an eNB 160. For each UE 102 in the cell, the eNB 160 may determine 202 whether a UE 102 is capable of simultaneous reception and transmission in aggregated cells. In other words, the eNB 160 may determine 202 whether the UE 102 is a full-duplex UE 102 or a half-duplex UE 102. In some implementations, the aggregated cells may include multiple transmission cells. Determining 202 whether a UE 102 is capable of simultaneous reception and transmission may include receiving information from the UE 102. For example, the eNB 160 may receive information indicating whether the UE 102 is capable of or is not capable of simultaneous transmission and reception via a simultaneous Tx-Rx field.

The eNB 160 may determine 204 the timing advance of each aggregated cell. In some implementations, the eNB 160 may receive information from the UE 102. For example, the eNB 160 may receive information from the UE 102 indicating the timing advances of the cells. The eNB 160 may determine 204 the timing advance of a cell based on the cell planning and coverage. The eNB 160 may determine 204 the timing advance of a cell based on the maximum timing advance value of all UE(s) 102 associated with the cell. It should be noted that the special subframe configuration may be cell-specific. For instance, all UEs 102 in a cell should follow the configuration. In other words, the eNB 160 may not configure different special subframe configurations for different UEs based on their capabilities.

The eNB 160 may determine 206 if all UEs 102 with carrier aggregation are capable of simultaneous reception and transmission. If all UEs 102 with carrier aggregation are capable of simultaneous reception and transmission, the eNB 160 may determine 208 a special subframe configuration for a cell (e.g., an aggregated cell) based on at least one timing advance (e.g., the maximum timing advance of the cell) (and whether a UE is capable of simultaneous reception and transmission, for instance). For example, if the eNB 160 determines 206 that all UEs 102 with carrier aggregation are capable of simultaneous reception and transmission, the eNB 160 may determine 208 a special subframe configuration of a cell based on a timing advance of the cell. In other words, the eNB 160 may optimize the special subframe configuration for each cell.

If the eNB 160 determines 206 that not all UEs 102 with carrier aggregation are capable of simultaneous reception and transmission, the eNB 160 may determine 210 the special subframe of a cell based on the timing advances of one or more (e.g., all) cells. In other words, the eNB 160 may determine the special subframe configurations of all cells with joint consideration and may not optimize the special subframe configuration for each cell. In some implementations, determining 210 the special subframe configuration may include obtaining the special subframe configuration. In some implementations, if there are UEs that are not capable of simultaneous reception and transmission in the aggregated cells, the eNB 160 may determine 210 a special subframe configuration for each individual cell independently.

The eNB 160 may determine 210 the special subframe configuration of a cell based on the timing advances of one or more (e.g., all) cells to ensure the guard period to one or more amounts. For example, the eNB 160 may configure the special subframe and guard periods of a cell such that the guard period of the special subframe in the different cells have an overlap of at least $1456 \cdot T_S$ and is more than a cell switching time and a processing time.

In another implementation, the eNB 160 may determine 210 the special subframe configurations and guard periods of a cell such that the effective guard period of the special subframe in the different cells have an overlap that is more than a cell switching time and a processing time (e.g., at least $1456 \cdot T_S$). The effective guard period of a cell may be defined as the guard period less a timing advance and the propagation delay (which has the same value of the timing advance). The cell switching time and the processing time may be the maximum individual cell switching time (selected among the aggregated cells) and the maximum individual processing time (selected among the aggregated cells).

In other words, the eNB 160 may determine 210 the special configuration of a cell a such that the guard period of the special subframe in the different cells have an overlap that is greater than the longest individual cell switching time and the longest individual processing time (e.g., at least $1456 \cdot T_S$). For example, the eNB 160 may determine 210 the special configuration of a cell such that the effective guard period of the cells has an overlap at least equal to the maximum cell switching and process time. Using the effective guard period to define the overlap further decreases the likelihood of a conflict region between a downlink transmission and an uplink transmission for half-duplex UEs 102. In some implementations, the eNB 160 may determine 210 the special configuration of a cell such that the guard period of the special subframe in the different cells have an overlap by a determined amount (e.g., $1456 \cdot T_S$).

As described herein, the guard period may be extended to one or more amounts. For example, the guard period may be extended such that an effective guard period is more than a cell switching time and a processing time. The effective guard period may be defined as the guard period less a maximum individual cell switching time (selected among the aggregated cells) and a maximum individual processing time (selected among the aggregated cells). In other words, the guard period may be extended such that the effective guard period for the aggregated cells is greater than the longest individual cell switching time and the longest individual processing time. For example, the guard period may be extended so that the effective guard period of the cells has an overlap at least equal to the maximum cell switching and process time. Using the effective guard period to define the overlap further decreases the likelihood of a conflict region between a downlink transmission and an uplink transmission for half-duplex UEs 102. In some implementations, the guard period may be extended by a determined amount (e.g., $1456 \cdot T_S$).

As described above, in some implementations, the guard period may be extended based on the duplexing mode of the UE 102. For example, the eNB 160 may receive an indication from the UE 102 that the UE 102 is not capable of simultaneous transmission and reception. In this example, the guard period may be extended. By comparison, the eNB 160 may receive an indication from the UE 102 that the UE 102 is capable of simultaneous transmission and reception. In this example, the guard period may not be extended.

The eNB 160 may transmit and receive 212 on at least one cell (e.g., one of the aggregated cells) based on the determined special subframe configuration of the cell. Transmitting and receiving 212 based on a special subframe configuration may include disregarding one or more restrictions from a special subframe configuration. For example, if all UEs with carrier aggregation are capable of simultaneous reception and transmission in the aggregated cells, no assumptions regarding a special subframe configuration may be needed. For example, in some cases a guard period of the special subframe may be assumed to have an overlap of at least $1456 \cdot T_S$. However, if the UE 102 is capable of simultaneous reception and transmission, there may be no need for this assumption. More specifically, if the UE 102 is capable of simultaneous reception and transmission, it may not be needed to assume that the guard period of the special subframe in the aggregated cells have an overlap of at least $1456 \cdot T_S$. Therefore, the UE 102 may support any combination of the different cells with the different special subframe configurations and the eNB 160 can configure any combination of cells for the UE 102. In particular, if the UE 102 is capable of simultaneous reception and transmission in the aggregated cells, transmitting and receiving 212 may be performed regardless of a conflict region resulting from the combination of special subframe configurations. More detail on the conflict region is provided below. It should be noted that the eNB 160 controls transmission and reception such that there may be no conflict of transmission and reception. For example, the UEs 102 may align their timing with a TA setting.

Disregarding restrictions from a special subframe configuration may be beneficial in that it may increase the channel utilization for a UE 102 that is capable of simultaneous reception and transmission. In some implementations, the same restrictions may be applied to UEs 102 capable of simultaneous reception and transmission and UEs 102 that do not support simultaneous reception and transmission. However, this will reduce the channel utilization for UEs 102 capable of simultaneous reception and transmission. For example, a UE 102 that is capable of simultaneous reception and transmission may not need to assume that the guard period overlap is at least $1456 \cdot T_S$. Furthermore, the eNB 160 may optimize the special subframe configuration for each cell.

An example is given as follows that implements a heterogeneous network or small cell deployment. In this example, a macro TDD cell may have a large coverage that may have a longer guard period and a longer UpPTS. A pico cell, or small cell, may have limited coverage that may have a shorter guard period and a shorter UpPTS. If the UEs 102 in the pico cell, or small cell, support simultaneous transmission, the eNB 160 may configure the special subframe configuration for each cell without considering the minimum $1456 \cdot T_S$ overlap between the cells. In this example, the eNB 160 may transmit and receive 206 based on the special subframe configuration regardless of any special subframe configurations (along with their corresponding restrictions) of the aggregated cells. In other words, the special subframe configuration used by the eNB 160 may not be based on the special subframe configurations of the aggregated cells. In some implementations, transmitting and receiving 206, regardless of a combination of special subframe configurations, may include disregarding one or more restrictions as described above. As described in connection with FIG. 2, the eNB 160 may evaluate UE 102 capabilities and decide a special subframe configuration based on the evaluation. The special subframe configuration may be optimized for each cell only if all UEs are full-duplex, for example.

Figure 3:
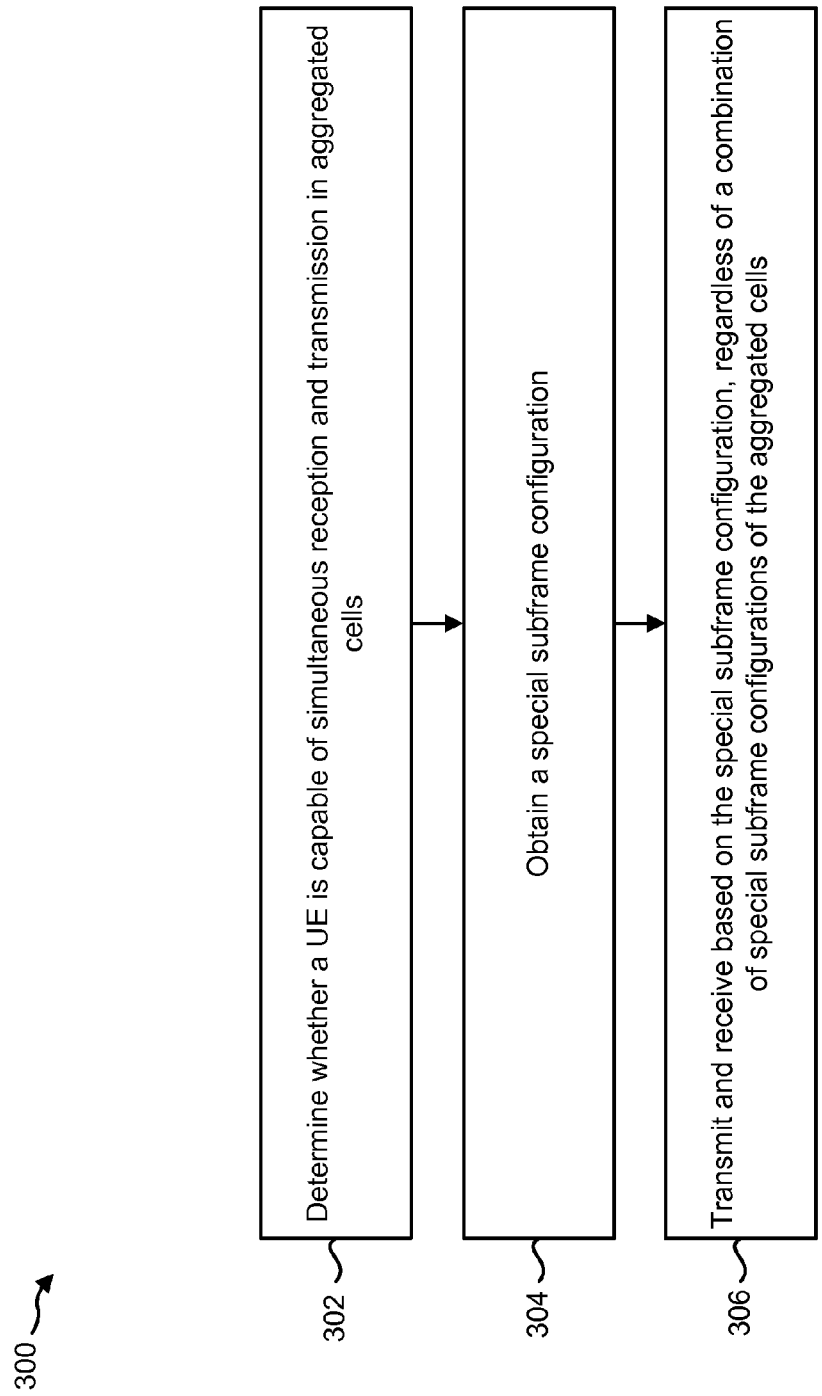
FIG. 3 is a flow diagram illustrating one implementation of a method for performing special subframe configuration for carrier aggregation by a UE.

FIG. 3 is a flow diagram illustrating one implementation of a method 300 for performing special subframe configuration for carrier aggregation by a UE 102. As described above, in some implementations, whether a UE 102 is capable of simultaneous transmission and reception may be indicated by the manufacturer. However, in some implementations, the UE 102 may need to determine if the UE 102 is capable of simultaneous transmission and reception (e.g., for example because of different combinations of aggregated cells). In these implementations, the UE 102 may determine 302 whether the UE 102 is capable of simultaneous reception and transmission in aggregated cells. In other words, the UE 102 may determine 302 whether the UE 102 is a full-duplex UE 102 or a half-duplex UE 102. For example, determining 302 whether a UE 102 is capable of simultaneous reception and transmission may include obtaining information located in the memory of the UE 102 that indicates UE 102 capabilities. In some implementations, the aggregated cells may include multiple transmission cells.

The UE 102 may obtain 304 a special subframe configuration. For example, the UE 102 may receive an indicator from the eNB 160 that indicates a special subframe configuration (e.g., a combination of special subframe configurations for aggregated cells). For instance, the UE 102 may select a special subframe configuration from a table stored in memory based on the received indicator. As will be described below, a special subframe may be implemented based on one or more configurations. The one or more configurations may be as listed in Table (2) below. Obtaining 304 a special subframe configuration may be based on the duplexing mode of a UE 102.

In some implementations, obtaining 304 the special subframe configuration may include assuming that the guard period of the special subframe in the different cells have an overlap of at least $1456 \cdot T_S$. Assuming "X" means that the logic circuitry and software resident in the UE 102 controlling its operation operates predicated on the condition "X" as true. In this example, some special subframe combinations may not be supported in TDD carrier aggregation.

The UE 102 may transmit and receive 306 based on a special subframe configuration, regardless of a combination of special subframe configurations of the aggregate cells. In some implementations, transmitting and receiving 306 may be performed if the UE 102 is capable of simultaneous reception and transmission in the aggregated cells. Transmitting and receiving 306 based on a special subframe configuration may include disregarding one or more restrictions from a special subframe configuration. For example, if a UE 102 is capable of simultaneous reception and transmission in the aggregated cells, no assumption regarding a special subframe configuration may be needed. For example, in some cases the UE 102 may assume a guard period of the special subframe to have an overlap of at least $1456 \cdot T_S$. However, if the UE 102 is capable of simultaneous reception and transmission, there may be no need for this assumption. In other words, if the UE 102 is capable of simultaneous reception and transmission, the UE 102 may not need to assume that the guard period of the special subframe in the aggregated cells have an overlap of at least $1456 \cdot T_S$. Therefore, the UE 102 may support any combination of special subframe configurations (if the UE 102 is capable of simultaneous reception and transmission in the aggregated cells, for example). In particular, transmitting and receiving 306 may be performed regardless of a conflict region resulting from the combination of special subframe configurations (if the UE 102 is capable of simultaneous reception and transmission in the aggregated cells, for example). More detail on the conflict region is provided below.

As described above, disregarding restrictions from a special subframe configuration may be beneficial in that it may increase the channel utilization for a UE 102 that is capable of simultaneous reception and transmission.

An example is given as follows that implements a heterogeneous network or small cell deployment. If the UEs 102 in a pico cell support simultaneous transmission, the eNB 160 may configure the special subframe configuration for each cell without considering the minimum $1456 \cdot T_S$ overlap between the cells. In this example, the UE 102 may transmit and receive 306 based on the special subframe configuration regardless of any special subframe configurations (along with their corresponding restrictions) of the aggregated cells.

Figure 4:
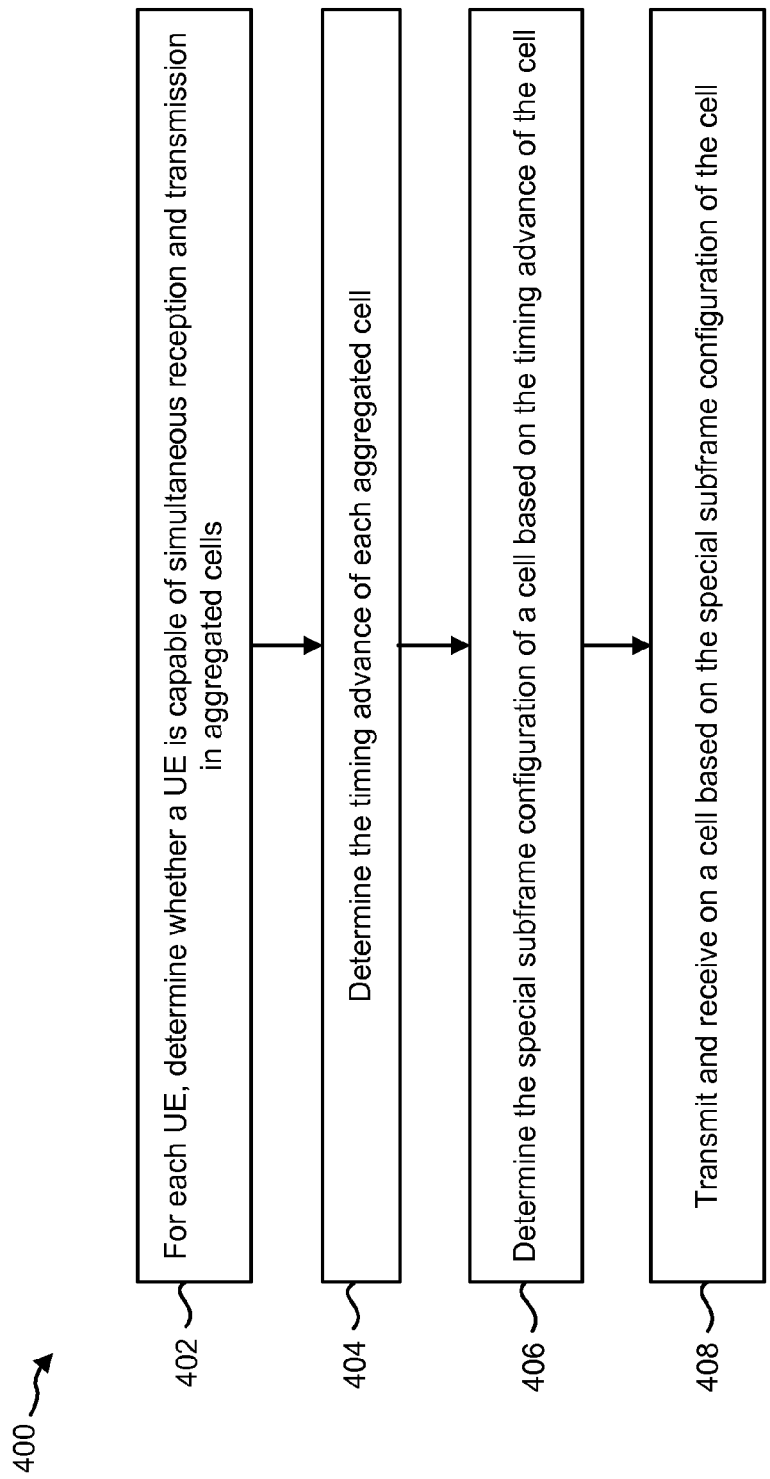
FIG. 4 is a flow diagram illustrating another implementation of a method for performing special subframe configuration for carrier aggregation by an eNB.

FIG. 4 is a flow diagram illustrating another implementation of a method 400 for performing special subframe configuration for carrier aggregation by an eNB 160. For each UE, the eNB 160 may determine 402 whether a UE 102 is capable of simultaneous reception and transmission in aggregated cells. In some implementations, this may be done as described in connection with FIG. 2.

The eNB 160 may determine 404 the timing advance of each aggregated cell. In some implementations, this may be done as described in connection with FIG. 2.

The eNB 160 may determine 406 the special subframe configuration of a cell based on the timing advance of the cell. In some implementations, this may be done as described in connection with FIG. 2. For example, the eNB 160 may jointly determine 406 the special subframe configurations of the aggregated cells.

The eNB 160 may transmit and receive 408 on a cell based on the special subframe configuration of the cell. Special handling by the UE behavior may be employed to deal with the potential overlapping of DwPTS reception and UpPTS transmission of a UE 102 that is not capable of simultaneous reception and transmission as given later. In some implementations, the eNB may configure UEs with carriers that have no overlapping of DwPTS reception and UpPTS transmission for a UE. In these implementations, the eNB 160 may optimize the special subframe configuration for each cell regardless of UE 102 capability. The potential collision may be handled by the UE 102. Or, the eNB 160 may schedule carrier aggregation so that no collision occurs. As described in connection with FIG. 4, the eNB 160 may optimize the special subframe configuration for each cell regardless of UE 102 capability. Potential collisions may accordingly be handled by UE 102 behavior. Alternatively, the eNB 160 may schedule carrier aggregation such that no collision occurs.

Figure 5:
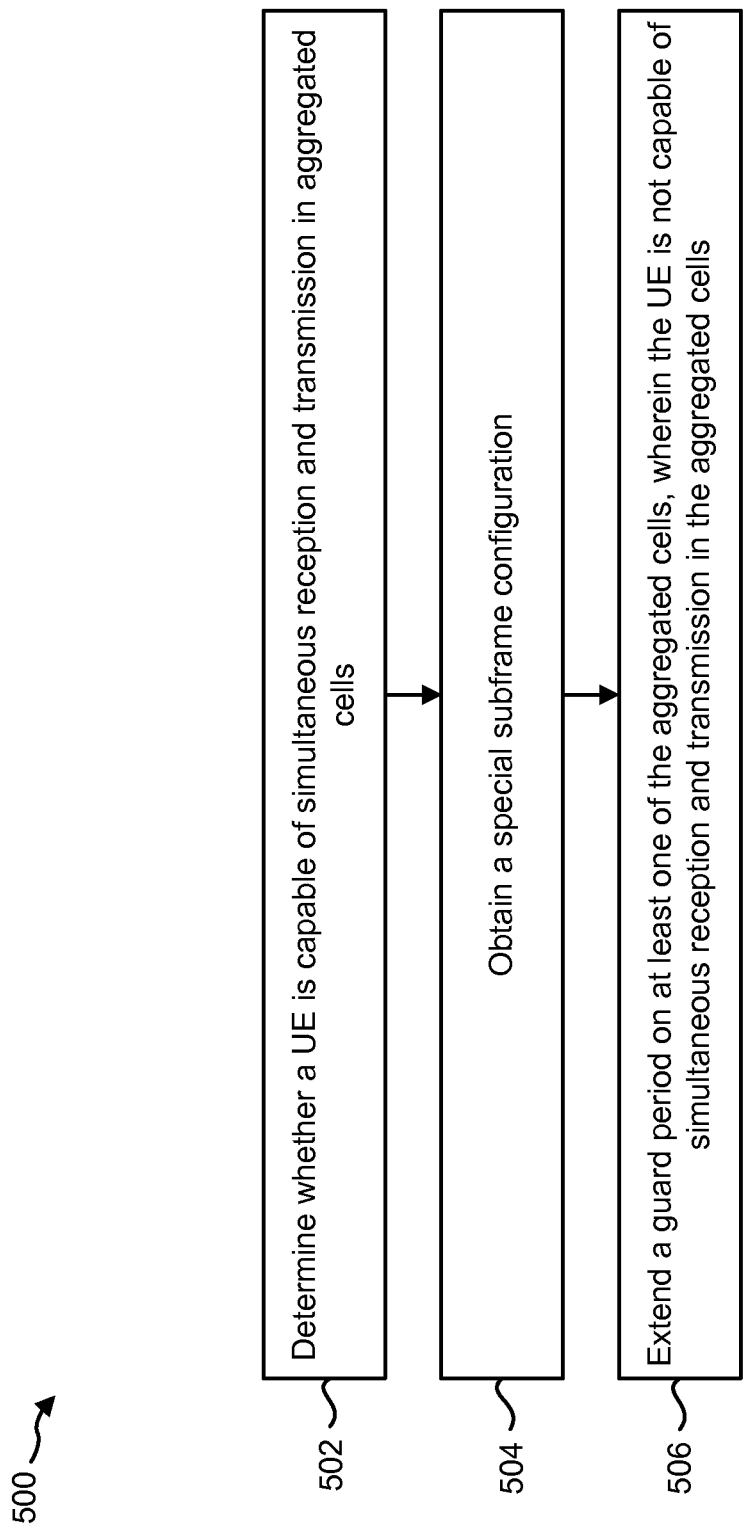
FIG. 5 is a flow diagram illustrating another implementation of a method for performing special subframe configuration for carrier aggregation by a UE.

FIG. 5 is a flow diagram illustrating another implementation of a method 500 for performing special subframe configuration for carrier aggregation by a UE 102. As described above, the UE 102 may optionally determine 502 whether a UE 102 is capable of simultaneous reception and transmission in aggregated cells. In some implementations, this may be done as described in connection with FIG. 3.

The UE 102 may obtain 504 a special subframe configuration. In some implementations, this may be done as described in connection with FIG. 3. For example, a UE 102 may transmit and receive based on the given special subframe configuration, regardless of special subframe configurations of the aggregated cells if the UE 102 is capable of simultaneous reception and transmission as described above.

The UE 102 may extend 506 a guard period on at least one of the aggregated cells, wherein the UE 102 is not capable of simultaneous reception and transmission in the aggregated cells. For example, the UE 102 may extend 506 a guard period to overcome the conflict region between a DwPTS of one cell and a UpPTS of another cell. In some implementations, extending 506 a guard period may include not receiving a portion of a DwTPS, a last portion for example.

In some implementations, the UE 102 may extend 506 the guard period based on received information. The UE 102 may extend 506 the guard period according to the information received from the UE 102 (e.g., the timing advance values of aggregated cells). In other implementations, extending 506 the guard period may include assuming an extension. For example, a UE 102 may assume a guard period is extended such that the guard period overlap is at least $1456 \cdot T_S$.

The UE 102 may extend 506 the guard period to one or more amounts. For example, the UE 102 may extend 506 a guard period such that an effective guard period is more than a cell switching time and a processing time. The effective guard period of a UE 102 may be defined as the guard period less a timing advance and the propagation delay (which has the same value of the timing advance). In other words, the UE 102 may extend 506 a guard period such that the effective guard period for the aggregated cells is greater than the longest individual cell switching time and the longest individual processing time. For example, the UE 102 may extend 506 the guard period so that the effective guard period of the cells has an overlap at least equal to the maximum cell switching and process time. Using the effective guard period to define the overlap further decreases the likelihood of a conflict region between a downlink transmission and an uplink transmission for half-duplex UEs 102. In some implementations, the UE 102 may extend 506 a guard period by a determined amount, for example, $1456 \cdot T_S$. In some implementations, extending 506 the guard period may include extending the guard period such that the guard period is greater than a maximum timing advance of at least one cell, a maximum propagation delay of at least one cell, a maximum cell switching period of at least one cell and a maximum processing time of at least one cell.

In some implementations, the aggregated cells may have multiple uplink-downlink configurations. For example, a first cell may have a first uplink-downlink configuration and a second cell may have a second uplink-downlink configuration. In this implementation, extending 506 a guard period may include assuming that the guard period has an overlap of a least $1456 \cdot T_S$. In other examples where the aggregated cells may have multiple uplink-downlink configurations, extending 506 a guard period may include assuming that the guard period has an overlap that is greater than a sum of a cell switching time and a processing time. In yet another example where the aggregated cells may have multiple uplink-downlink configurations, the UE 102 may assume that the guard period is extended by not receiving a last portion of a downlink pilot time slot of any cell that overlaps with any uplink pilot time slot of another cell.

In some implementations, extending 506 the guard period may be based on a type of a serving cell. For example, a UE 102 may assume that the guard period is extended based on a type of serving cell in some implementations. In a case where multiple cells with different uplink-downlink configurations are aggregated (e.g., where the aggregated cells implement multiple uplink-downlink configurations) and the UE 102 is not capable of simultaneous reception and transmission in the aggregated cells, if the subframe in the primary cell is a special subframe and the same subframe in a secondary cell is a special subframe, the UE 102 may be not be expected to receive (e.g., may not receive) one or more of a physical downlink shared channel (PDSCH), an enhanced physical downlink control channel (EPDCCH), a physical multicast channel (PMCH) and a positioning reference signal (PRS) transmission in the secondary cell in the same subframe. In that case, the UE 102 may also not be expected to receive (e.g., may not receive) any other signals on the secondary cell in orthogonal frequency-division multiplexing (OFDM) symbols that overlap with the guard period or uplink pilot time slot (UpPTS) in the primary cell. Additionally in that case, the UE 102 may not transmit any signal on the secondary cell in OFDM symbol(s) that overlaps with the downlink pilot time slot (DwPTS) in the primary cell.

Figure 6:
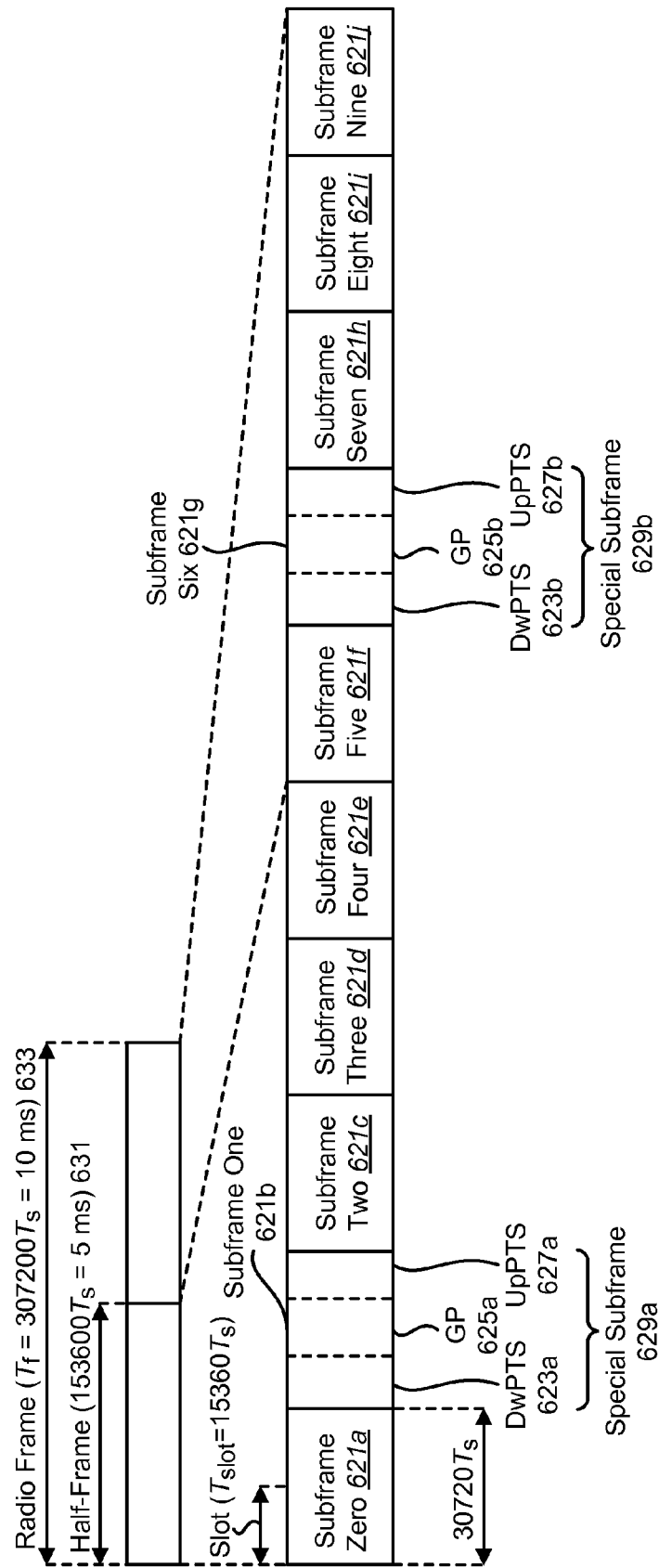
FIG. 6 is a diagram illustrating one example of a radio frame that may be used in accordance with the systems and methods disclosed herein.

FIG. 6 is a diagram illustrating one example of a radio frame 633 that may be used in accordance with the systems and methods disclosed herein. This radio frame 633 structure illustrates a TDD structure. Each radio frame 633 may have a length of $T_f = 307200 \cdot T_S = 10$ milliseconds (ms), where $T_f$ is a radio frame 633 duration and $T_S$ is a time unit equal to $$\frac{1}{(15000 \times 2048)}$$

seconds. The radio frame 633 may include two half-frames 631, each having a length of $153600 \cdot T_S = 5$ ms. Each half-frame 631 may include five subframes 621a-e, 621f-j each having a length of $30720 \cdot T_S = 1$ ms.

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes a UL subframe.

TABLE 1

| TDD UL-DL Config- uration Number | Downlink- to-Uplink Switch- Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_S = 1$ ms. In Table (2), "cyclic prefix" is abbreviated as "CP" and "configuration" is abbreviated as "Config" for convenience.

TABLE 2

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

As described above, UL-DL configurations with both 5 ms and 10 ms downlink-to-uplink switch-point periodicity may be supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 621 that may be used include a downlink subframe, an uplink subframe and a special subframe 629. In the example illustrated in FIG. 6, which has a 5 ms periodicity, two standard special subframes 629a-b are included in the radio frame 633.

The first special subframe 629a includes a downlink pilot time slot (DwPTS) 623a, a guard period (GP) 625a and an uplink pilot time slot (UpPTS) 627a. In this example, the first standard special subframe 629a is included in subframe one 621b. The second standard special subframe 629b includes a downlink pilot time slot (DwPTS) 623b, a guard period (GP) 625b and an uplink pilot time slot (UpPTS) 627b. In this example, the second standard special subframe 629b is included in subframe six 621g. The length of the DwPTS 623a-b and UpPTS 627a-b may be given by Table 4.2-1 of 3GPP TS 36.211 (illustrated in Table (2) above) subject to the total length of each set of DwPTS 623, GP 625 and UpPTS 627 being equal to $30720 \cdot T_S = 1$ ms.

Each subframe i 621a-j (where i denotes a subframe ranging from subframe zero 621a (e.g., 0) to subframe nine 621j (e.g., 9) in this example) is defined as two slots, 2i and 2i+1 of length $T_{slot} = 15360 \cdot T_s = 0.5$ ms in each subframe 621. For example, subframe zero (e.g., 0) 621a may include two slots, including a first slot.

FIG. 6 illustrates one example of a radio frame 633 with 5 ms switch-point periodicity. In the case of 5 ms downlink-to-uplink switch-point periodicity, each half-frame 631 includes a standard special subframe 629a-b. In the case of 10 ms downlink-to-uplink switch-point periodicity, a special subframe may exist in the first half-frame 631 only.

Subframe zero (e.g., 0) 621a and subframe five (e.g., 5) 621f and DwPTS 623a-b may be reserved for downlink transmission. The UpPTS 627a-b and the subframe(s) immediately following the special subframe(s) 629a-b (e.g., subframe two 621c and subframe seven 621h) may be reserved for uplink transmission.

In some implementations, if the UE 102 is not capable of simultaneous reception and transmission in the aggregated cells the following constraints may apply. If the subframe in the primary cell is a downlink subframe, the UE 102 may not transmit any signal or channel on a secondary cell in the same subframe. If the subframe in the primary cell is an uplink subframe, the UE 102 may not be expected to receive any downlink transmissions on a secondary cell in the same subframe. If the subframe in the primary cell is a special subframe and the same subframe in a secondary cell is a downlink subframe, the UE 102 may not be expected to receive physical downlink shared channel (PDSCH), enhanced dedicated channel (E-DCH) dedicated physical control channel (EPDCCH) or physical multicast channel (PMCH)/positioning reference signal (PRS) transmissions in the secondary cell in the same subframe. Furthermore, the UE 102 may not be expected to receive other signals on the secondary cell in orthogonal frequency-division multiplexing (OFDM) symbol(s) that overlaps with the guard period or UpPTS in the primary cell.

Figure 7:
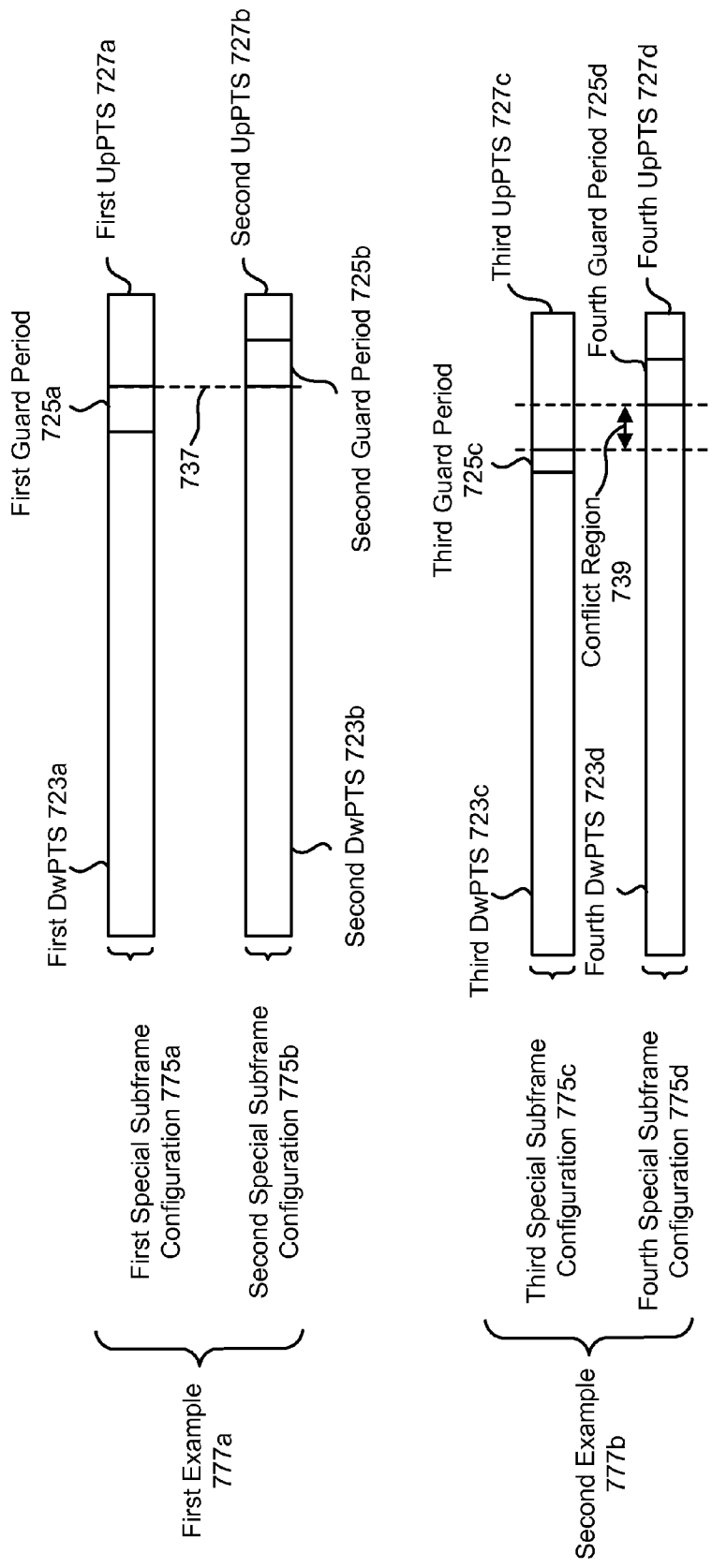
FIG. 7 illustrates examples of special subframe configurations.

FIG. 7 illustrates examples of special subframe configurations. As described above, a cell may include a special subframe configuration 775a-d. Each special subframe configuration 775a-d may include a DwPTS 723a-d, a guard period 725a-d and a UpPTS 727a-d. In some implementations, the special subframe configurations 775a-d may be used on TDD cells. In a first example 777a, the first special subframe configuration 775a on one cell (special subframe configuration 8, for example) and the second special subframe configuration 775b on another cell (special subframe configuration 4, for example) may implement a normal cyclic prefix on the DwPTSs 723a-b of both special subframe configurations 775a-b. As can be seen from the first example 777a, if a normal cyclic prefix is used on the UpPTSs 727a-b of the special subframe configurations 775a-b, there may be no gap between the second DwPTS 723b and the first UpPTS 727a, as indicated by the dashed line 737.

In a second example 777b, the third special subframe configuration 775c on one cell (special subframe configuration 8, for example) may use an extended cyclic prefix on the third DwPTS 723c. Furthermore, a normal cyclic prefix may be used on the fourth UpPTS 727d of the fourth special subframe configuration 775d on another cell (special subframe configuration 4, for example). In this example, the third UpPTS 727c may overlap and conflict with the fourth DwPTS 723d. This may result in a conflict region 739 that may impede the efficiency of downlink and uplink transmission.

Figure 8:
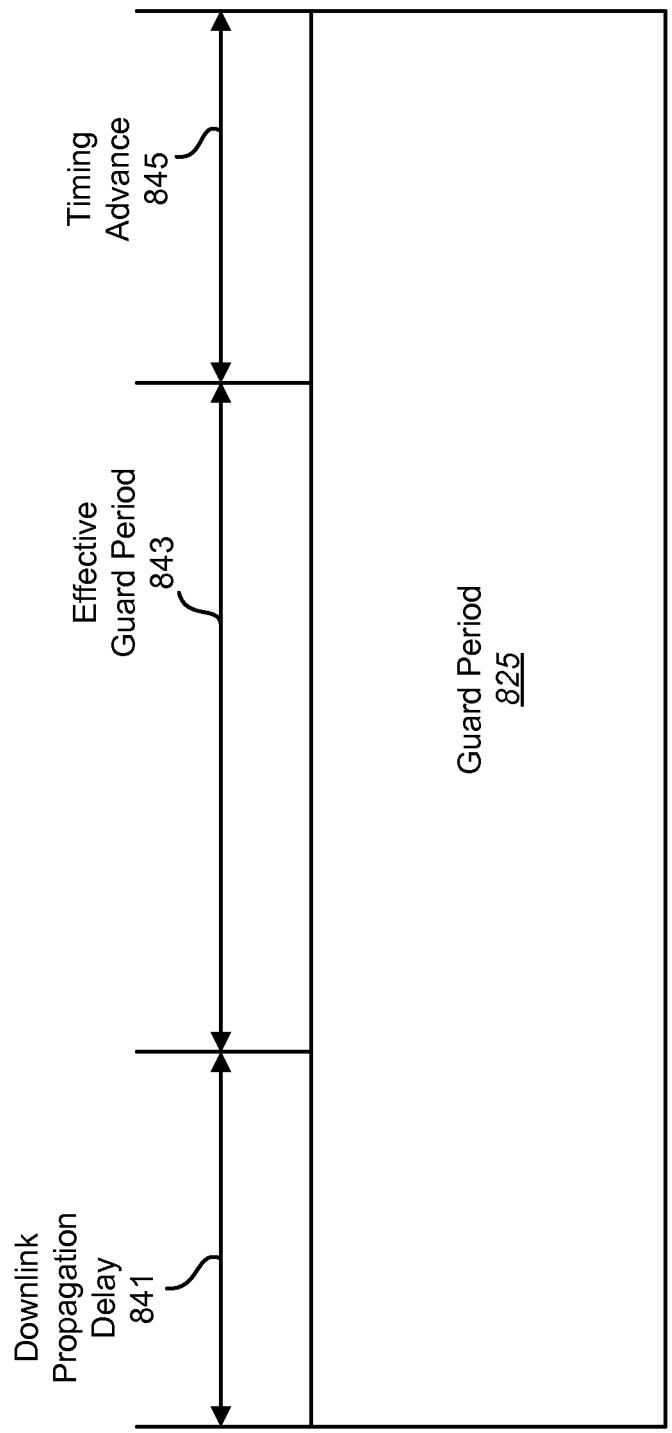
FIG. 8 illustrates an example of a guard period of a special subframe.

FIG. 8 illustrates an example of a guard period 825 of a special subframe. As described above, the eNB 160 may extend the guard period 825 based on an effective guard period 843. The effective guard period 843 may be the guard period 825 less a timing advance 845 and a downlink propagation delay 841. The timing advance 845 of a cell may be decided by cell coverage and planning. The timing advance 845 of a cell may be the maximum timing advance of all the UEs in the given cell. There may be a TA 845 for each cell. In some implementations, the maximum timing advance of a cell may be determined by the maximum propagation delay of the cell (e.g., it depends on the cell coverage). In some implementations, the downlink propagation delay 841 may be the same as the timing advance 845. As described above, the eNB 160 may configure the special subframe configuration so that the effective guard period 843 is greater than the cell switching and processing time. For a UE 102, the TA may be configured for each TA group (or each cell).

The effective guard period 843 may be defined as the guard period 825 less a maximum allowable timing advance 845 and maximum allowable downlink propagation delay 841. In some implementations, the timing advance 845 may be based on the downlink propagation delay 841. In these implementations, the effective guard period 843 may be defined by the relationship $Len_{GP\_effective\_Cell} = Len_{GP\_Cell} - 2 \cdot TA_{max\_Cell}$, where $Len_{GP\_effective\_Cell}$ is the length of the effective guard period 843 of the cell, $Len_{GP\_Cell}$ is the length of the guard period 825 of a special subframe configuration of the cell and $TA_{max\_Cell}$ is the maximum allowed timing advance 845 of the cell.

Figure 9:
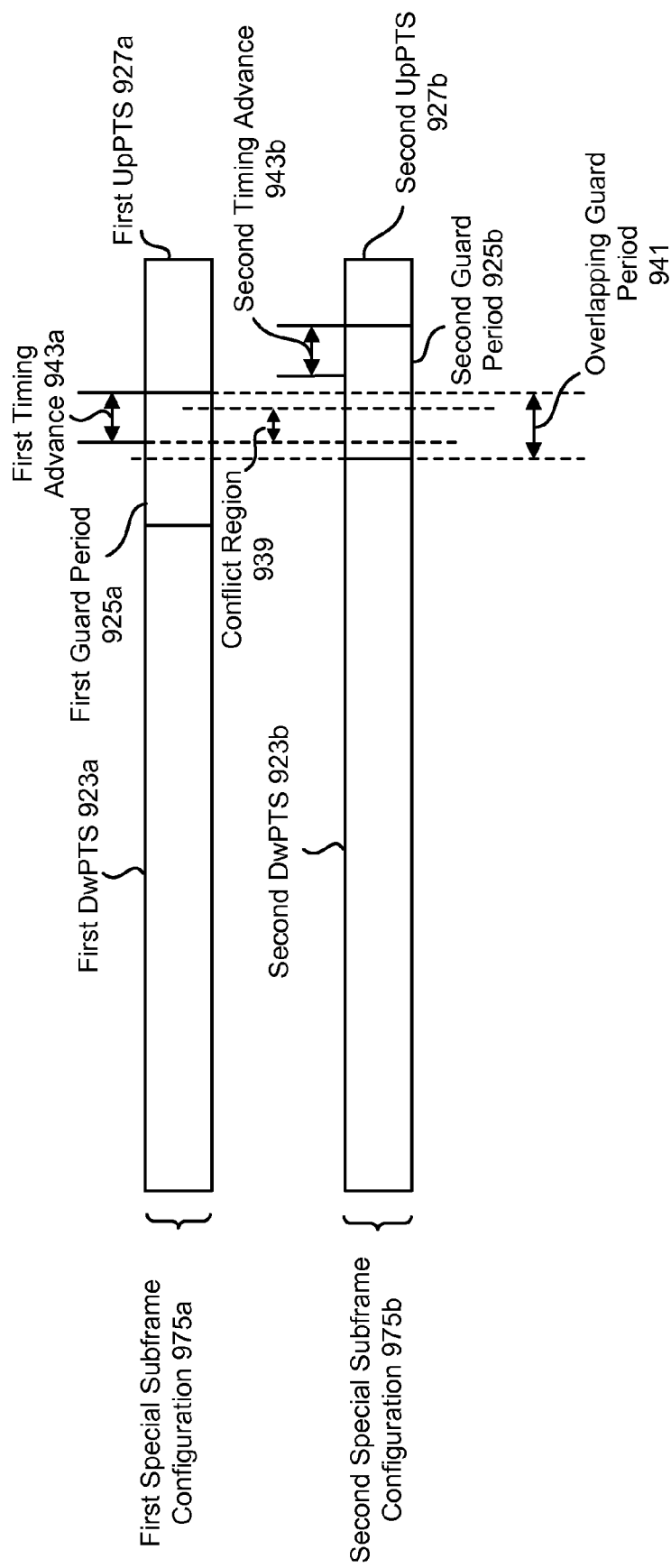
FIG. 9 illustrates more examples of special subframe configurations.

FIG. 9 illustrates more examples of special subframe configurations. The special subframe configurations 975a-b may include DwPTSs 923a-b, guard periods 925a-b and UpPTSs 927a-b that may be examples of corresponding elements described above.

Each special subframe configuration 975a-b may include a timing advance 943a-b. In some implementations, the same timing advance 943a-b may be used on the special subframe configurations 975a-b. In FIG. 9, the first special subframe configuration 975a and the second special subframe configuration 975b may implement a normal cyclic prefix on the DwPTSs 923a-b and the UpPTSs 927a-b. The first special subframe configuration 975a may be special subframe configuration 7 and the second special subframe configuration 975b may be special subframe configuration 3. The guard periods 925a-b of each special subframe configuration 975a-b may have a length of two OFDM symbols. Accordingly, an overlapping guard period region 941 may have a length of one OFDM symbol, which is more than $1456 \cdot T_S$. However, due to the first timing advance 943a and the downlink propagation delay on the second special subframe configuration 975b, the UL transmission of the first UpPTS 927a may conflict with the DL reception of the second DwPTS 923b, as indicated by the conflict region 939 in FIG. 9. In some implementations, the conflict region 939 should consider the downlink propagation delay (which may be the same length as the timing advance, for example) of the DwPTS 923 and the timing advance 943 for the UpPTS 927 of each cell. Considering the round trip, the timing advance 943 length may be smaller than half of the guard period 925 length.

Figure 10:
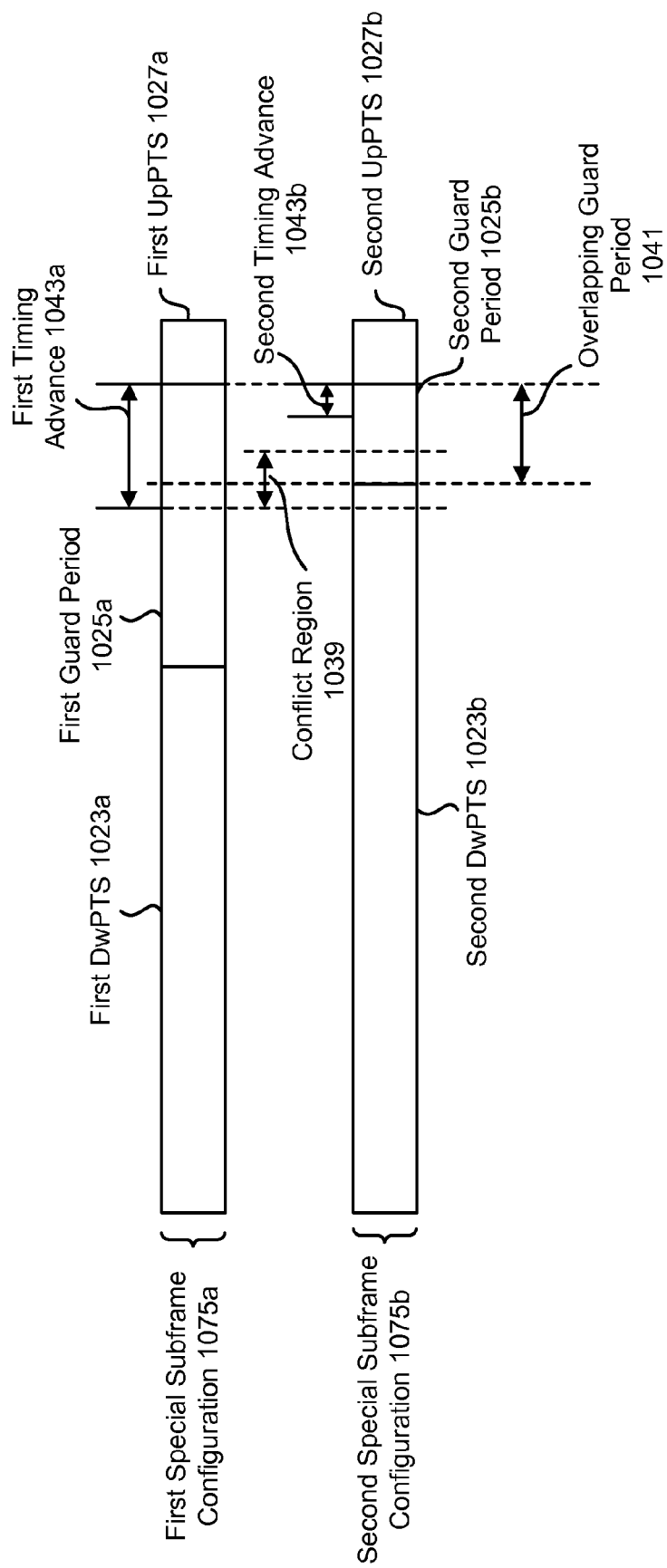
FIG. 10 illustrates more examples of special subframe configurations.

FIG. 10 illustrates more examples of special subframe configurations. The special subframe configurations 1075a-b may include DwPTSs 1023a-b, guard periods 1025a-b, UpPTSs 1027a-b and timing advances 1043a-b that may be examples of corresponding elements described above. In some implementations, the UE 102 may be configured with multiple timing advances 1043a-b. If a UE 102 is configured with multiple timing advances 1043a-b, each special subframe configuration 1075a-b may have different timing advances 1043a-b.

An example may include a heterogeneous network or small cell deployment. The first special subframe configuration 1075a (e.g., a macro cell) may have a larger first timing advance 1043a. A second special subframe configuration 1075b (e.g., a pico cell or small cell) may have a smaller second timing advance 1043b. As depicted in FIG. 10, special subframe configurations 1075a-b with different timing advances 1043a-b may generate a conflict region 1039 between the second DwPTS 1023b and the first UpPTS 1027a due to different timing advances 1043a-b. In this example, the overlapping guard period region 1041 may be the length of one OFDM symbol, which is more than $1456 \cdot T_S$, but a conflict region 1039 may exist for half-duplex UEs 102 due to different timing advances 1043a-b.

Figure 11:
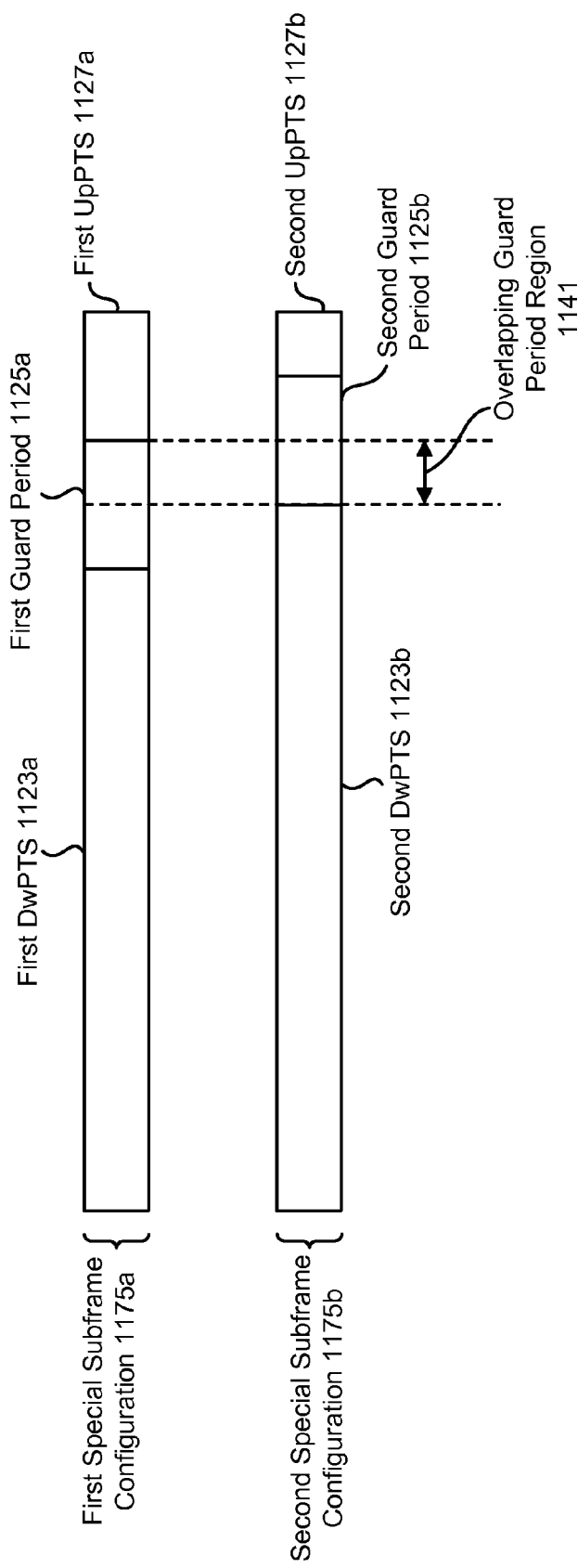
FIG. 11 illustrates more examples of special subframe configurations.

FIG. 11 illustrates more examples of special subframe configurations. The special subframe configurations 1175a-b may include DwPTSs 1123a-b, guard periods 1125a-b and UpPTSs 1127a-b that may be examples of corresponding elements described above. As described above, if multiple cells are aggregated and if a UE 102 does not support simultaneous reception and transmission, an eNB 160 may configure the special subframe configurations 1175a-b of the aggregated cells so that there is no conflicting region for the guard period 1125a-b of the aggregated cells. In other words, the eNB 160 may extend the guard period 1125a-b to generate an overlapping guard period region 1141. If the UE 102 is not capable of simultaneous reception and transmission, the UE 102 may assume that the guard period 1125a-b of the special subframes 1129a-b in the different cells have an overlapping guard period region 1141 of at least $1456 \cdot T_S$.

Figure 12:
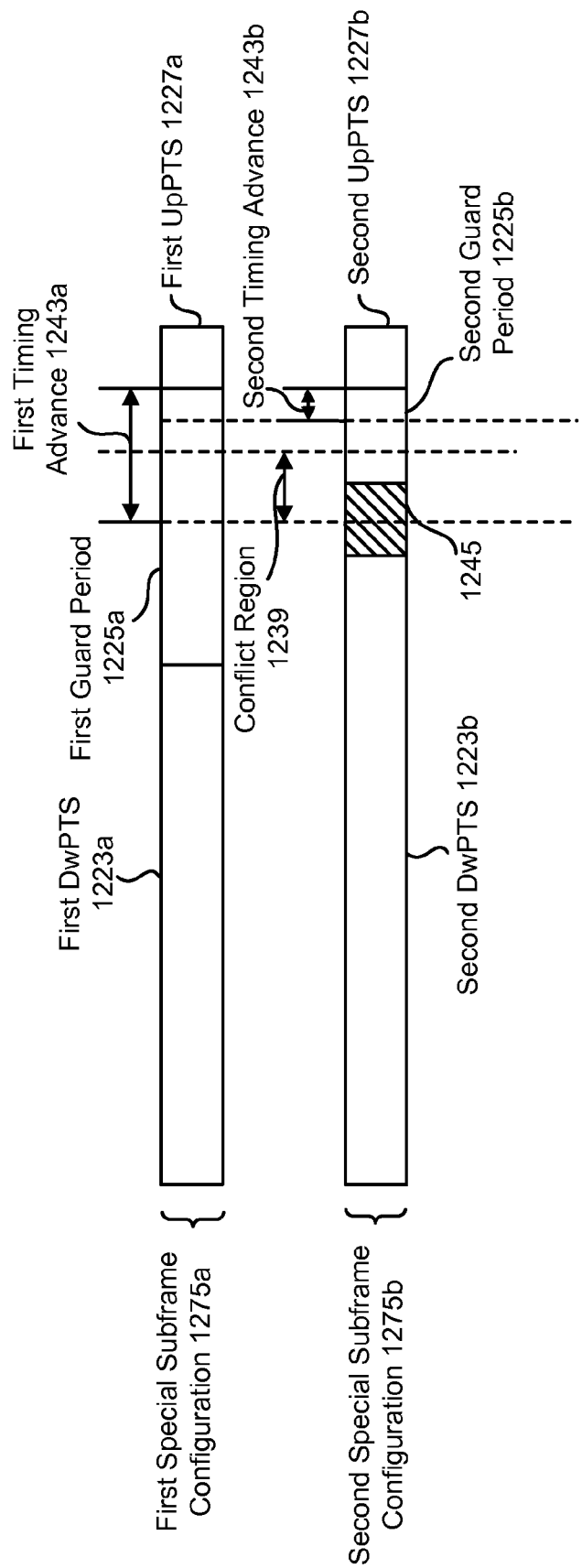
FIG. 12 illustrates more examples of special subframe configurations.

FIG. 12 illustrates more examples of special subframe configurations. As described above, the special subframe configurations 1275a-b may include DwPTSs 1223a-b, guard periods 1225a-b, UpPTSs 1227a-b and timing advances 1243a-b that may be examples of corresponding elements described above. In some implementations, a conflict region 1239 may not be avoided. Accordingly, special handling methods may be used for a half-duplex UE 102. For a half-duplex frequency-division duplex (FDD) operation, the second guard period 1225b may be extended by not receiving the last part 1245 of the second DwPTS 1223b. For example, in cases where the UE 102 is capable of different uplink-downlink configurations and where the UE 102 does not support simultaneous reception and transmission, the second guard period 1225b may be extended by not receiving the last part 1245 of the second DwPTS 1223b that overlaps with the first UpPTS 1227a transmission of another cell. In some implementations, the last part 1245 of the second DwPTS 1223b may immediately precede an uplink subframe from the same UE 102. In some implementations, the UE 102 may sacrifice some resources by creating an overlap region and may not allow the eNB 160 to utilize the channel resources efficiently, especially for UEs 102 that support simultaneous reception and transmission. Not receiving the last part 1245 of the second DwPTS 1223b may be beneficial, as it does not require the UE 102 to sacrifice resources by creating the overlap region between the guard periods of different cells.

Figure 13:
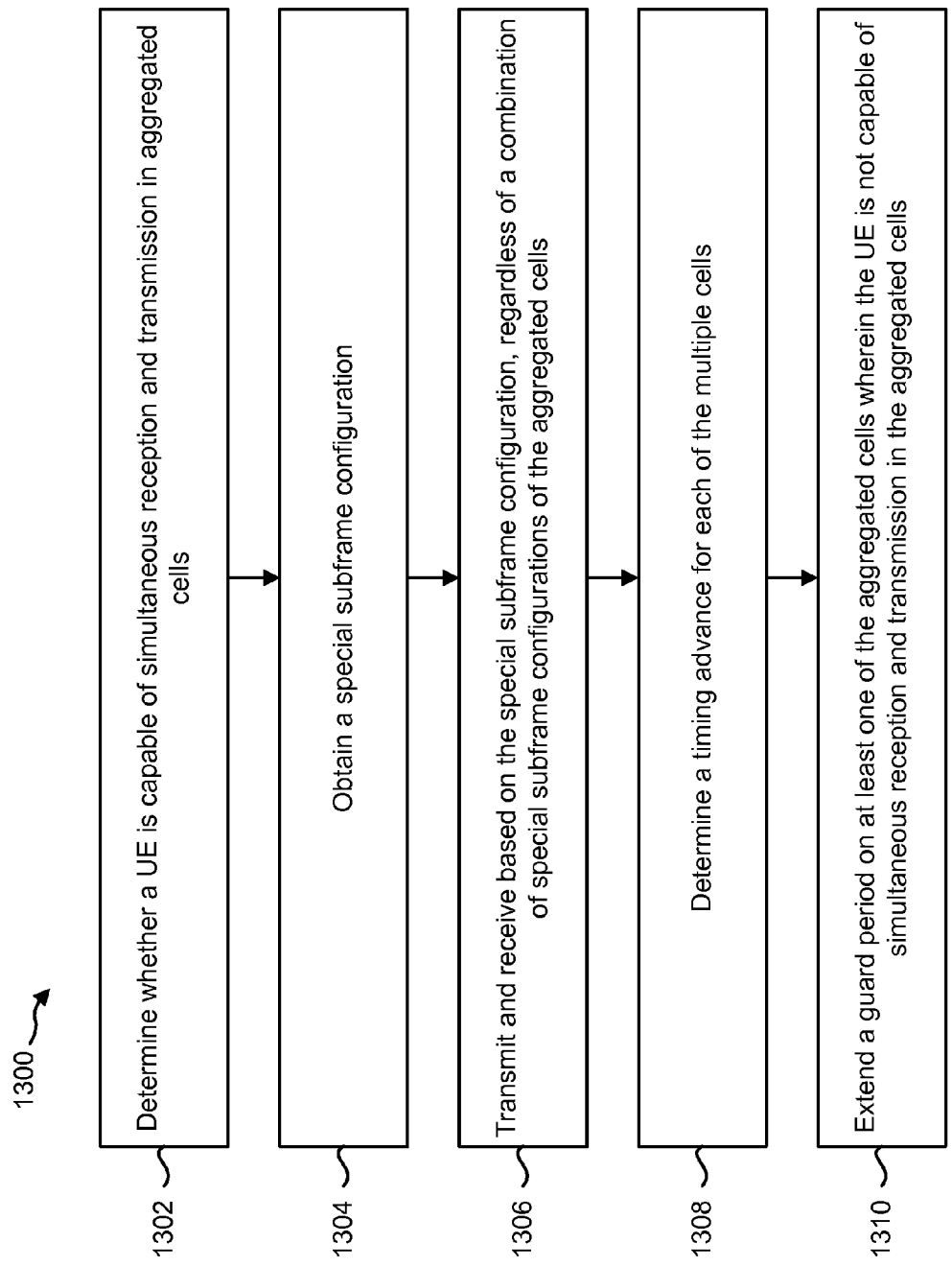
FIG. 13 is a flow diagram illustrating a more specific implementation of a method for performing special subframe configuration for carrier aggregation by a UE.

FIG. 13 is a flow diagram illustrating a more specific implementation of a method 1300 for performing special subframe configuration for carrier aggregation by a UE 102. As described above, in some implementations, the UE 102 may determine 1302 whether the UE 102 is capable of simultaneous reception and transmission in aggregated cells. In some implementations, this may be done as described in connection with FIG. 3.

The UE 102 may obtain 1304 a special subframe configuration. In some implementations, this may be done as described in connection with FIG. 3.

The UE 102 may transmit and receive 1306 on a cell based on a special subframe configuration, regardless of a combination of special subframe configurations of the aggregated cells. In some implementations, this may be done as described in connection with FIG. 3.

The UE 102 may determine 1308 a timing advance for each of the multiple cells. Determining 1308 a timing advance may include determining whether a UE 102 is capable of supporting multiple timing advances. For example, the UE 102 may obtain UE capability information from memory and may send a multipleTimingAdvance field to indicate whether the UE 102 is capable of supporting multiple timing advances. In some implementations, the UE 102 may determine 1308 the timing advances based on one or more indicators sent by the eNB 160.

The UE 102 may extend 1310 a guard period 825 on at least one of the aggregated cells wherein the UE 102 is not capable of simultaneous reception and transmission in the aggregated cells. In some implementations, this may be done as described in connection with FIG. 5.

In some implementations, the UE 102 may extend 1310 the guard period 825 based on the timing advances 845. For example, if the UE 102 determines that the UE 102 does support multiple timing advances 845, the UE 102 may extend 1310 the guard period 825 such that the effective guard period 843 of each cell may be enough to do the DL-to-UL switching. Accordingly, the UE 102 should extend 1310 the guard period 825 of the special subframe 729 of the cell so that the effective guard period 843 is at least more than the total length of the allowed maximum timing advance 845 and the downlink propagation delay 841 of all UEs 102 and the maximum cell switching and process time of all UEs 102. As described above, the UE 102 may extend 1310 the guard period 825 based on information received from the eNB 160, for example. The UE 102 may extend 1310 the guard period 825 on a cell by not receiving the last part of the DwPTS of the cell that overlaps with the UpPTS transmission of another cell.

In some implementations, the UE 102 may extend 506 the guard period 825 based on the type of serving cell. For example, a UE 102 may assume that the guard period is extended based on a type of serving cell in some implementations. In a case where multiple cells with different uplink-downlink configurations are aggregated and the UE 102 is not capable of simultaneous reception and transmission in the aggregated cells, if the subframe in the primary cell is a special subframe and the same subframe in a secondary cell is a special subframe, the UE 102 may be not expected to receive (e.g., may not receive) one or more of PDSCH, EPDCCH, PMCH and PRS transmissions in the secondary cell in the same subframe. In that case, the UE 102 may also not be expected to receive (e.g., may not receive) any other signals on the secondary cell in OFDM symbol(s) that overlaps with the guard period or UpPTS in the primary cell. Additionally in that case, the UE 102 may not transmit any signal on the secondary cell in OFDM symbol(s) that overlaps with the DwPTS in the primary cell.

Figure 14:
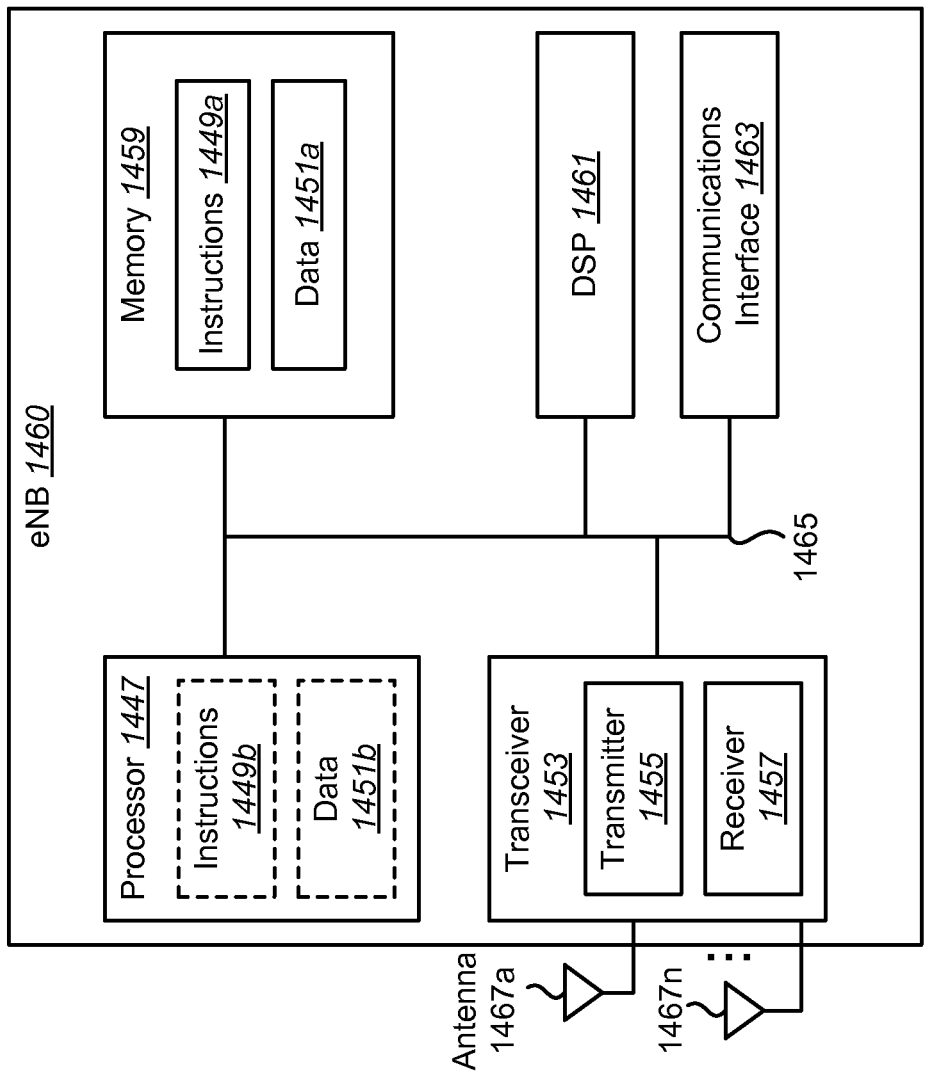
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1447 that controls operation of the eNB 1460. The processor 1447 may also be referred to as a central processing unit (CPU). Memory 1459, which may include read-only memory (ROM), random access memory (RAM), a combination of the two or any type of device that may store information, provides instructions 1449a and data 1451a to the processor 1447. A portion of the memory 1459 may also include non-volatile random access memory (NVRAM). Instructions 1449b and data 1451b may also reside in the processor 1447. Instructions 1449b and/or data 1451b loaded into the processor 1447 may also include instructions 1449a and/or data 1451a from memory 1459 that were loaded for execution or processing by the processor 1447. The instructions 1449b may be executed by the processor 1447 to implement one or more of the methods 200 and 400 described above.

The eNB 1460 may also include a housing that contains one or more transmitters 1455 and one or more receivers 1457 to allow transmission and reception of data. The transmitter(s) 1455 and receiver(s) 1457 may be combined into one or more transceivers 1453. One or more antennas 1467a-n are attached to the housing and electrically coupled to the transceiver 1453.

The various components of the eNB 1460 are coupled together by a bus system 1465, which may include a power bus, a control signal bus and a status signal bus, in addition to a data bus. However, for the sake of clarity, the various buses are illustrated in FIG. 14 as the bus system 1465. The eNB 1460 may also include a digital signal processor (DSP) 1461 for use in processing signals. The eNB 1460 may also include a communications interface 1463 that provides user access to the functions of the eNB 1460. The eNB 1460 illustrated in FIG. 14 is a functional block diagram rather than a listing of specific components.

Figure 15:
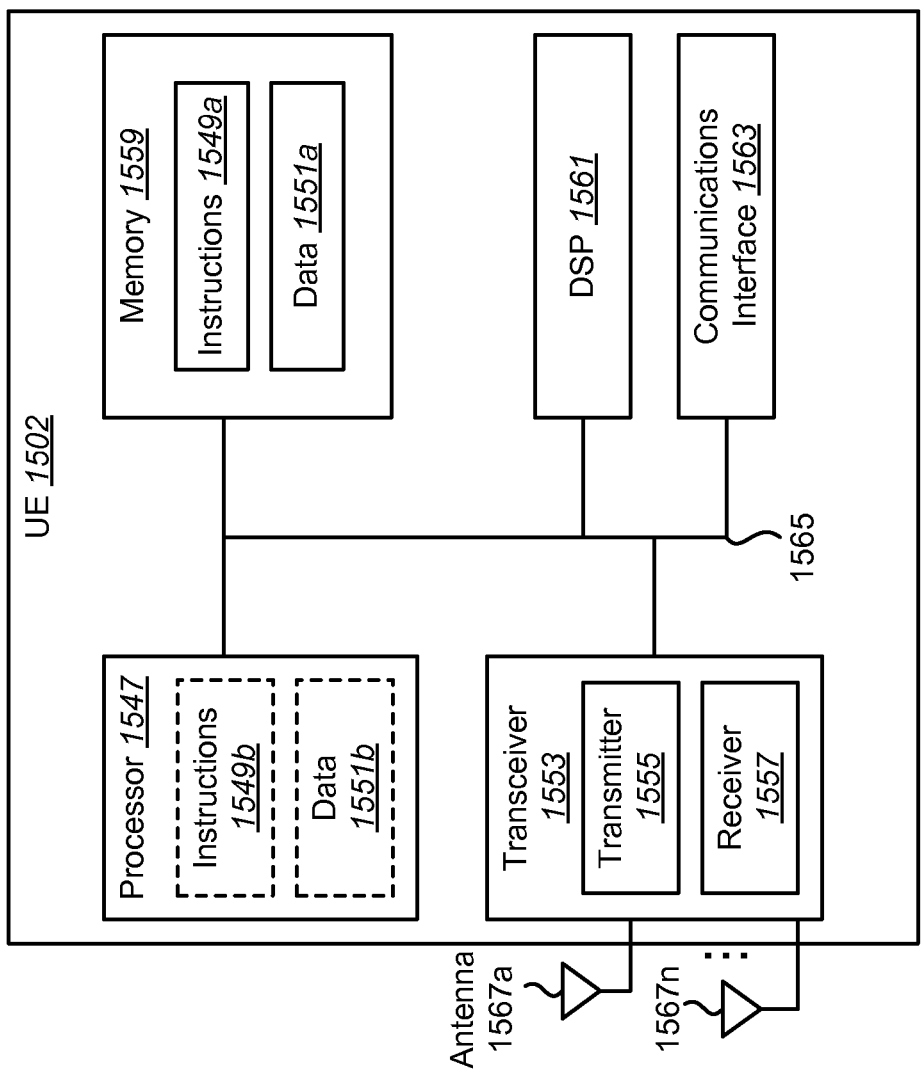
FIG. 15 illustrates various components that may be utilized in a UE.

FIG. 15 illustrates various components that may be utilized in an UE 1502. The UE 1502 described in connection with FIG. 15 may be implemented in accordance with the UE 102 described in connection with FIG. 1. The UE 1502 includes a processor 1547 that controls operation of the UE 1502. The processor 1547 may also be referred to as a central processing unit (CPU). Memory 1559, which may include read-only memory (ROM), random access memory (RAM), a combination of the two or any type of device that may store information, provides instructions 1549a and data 1551a to the processor 1547. A portion of the memory 1559 may also include non-volatile random access memory (NVRAM). Instructions 1549b and data 1551b may also reside in the processor 1547. Instructions 1549b and/or data 1551b loaded into the processor 1547 may also include instructions 1549a and/or data 1551a from memory 1559 that were loaded for execution or processing by the processor 1547. The instructions 1549b may be executed by the processor 1547 to implement one or more of the methods 300, 500 and 1300 described above.

The UE 1502 may also include a housing that contains one or more transmitters 1555 and one or more receivers 1557 to allow transmission and reception of data. The transmitter(s) 1555 and receiver(s) 1557 may be combined into one or more transceivers 1553. One or more antennas 1567a-n are attached to the housing and electrically coupled to the transceiver 1553.

The various components of the UE 1502 are coupled together by a bus system 1565, which may include a power bus, a control signal bus and a status signal bus, in addition to a data bus. However, for the sake of clarity, the various buses are illustrated in FIG. 15 as the bus system 1565. The UE 1502 may also include a digital signal processor (DSP) 1561 for use in processing signals. The UE 1502 may also include a communications interface 1563 that provides user access to the functions of the UE 1502. The UE 1502 illustrated in FIG. 15 is a functional block diagram rather than a listing of specific components.

Figure 16:
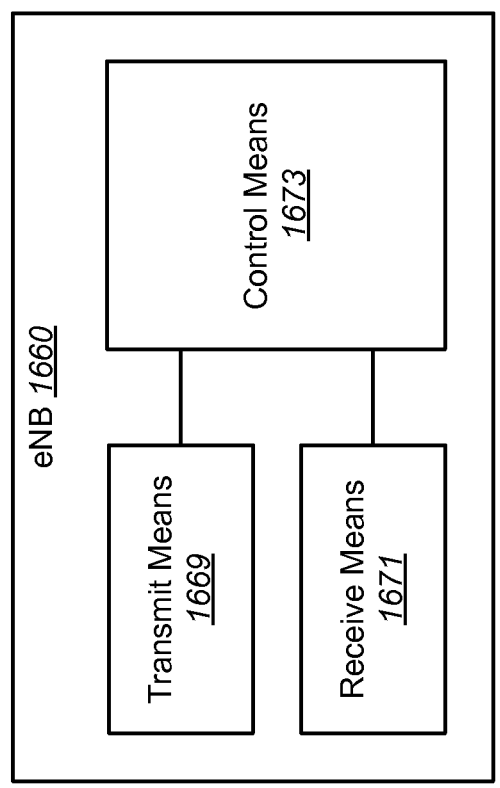
FIG. 16 is a block diagram illustrating one configuration of an eNB in which systems and methods for special subframe configuration for carrier aggregation may be implemented.

FIG. 16 is a block diagram illustrating one configuration of an eNB 1660 in which systems and methods for special subframe configuration for carrier aggregation may be implemented. The eNB 1660 includes transmit means 1669, receive means 1671 and control means 1673. The transmit means 1669, receive means 1671 and control means 1673 may be configured to perform one or more of the functions described in connection with FIG. 2, FIG. 4 and FIG. 14 above. FIG. 14 above illustrates one example of a concrete apparatus structure of FIG. 16. Other various structures may be implemented to realize one or more of the functions of FIG. 2, FIG. 4 and FIG. 14. For example, a DSP may be realized by software.

Figure 17:
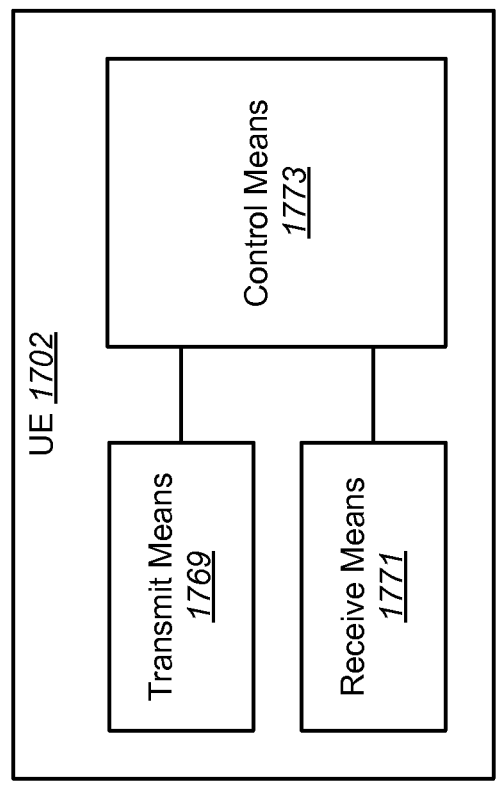
FIG. 17 is a block diagram illustrating one configuration of a UE in which systems and methods for special subframe configuration for carrier aggregation may be implemented.

FIG. 17 is a block diagram illustrating one configuration of a UE 1702 in which systems and methods for special subframe configuration for carrier aggregation may be implemented. The UE 1702 includes transmit means 1769, receive means 1771 and control means 1773. The transmit means 1769, receive means 1771 and control means 1773 may be configured to perform one or more of the functions described in connection with FIG. 3, FIG. 5, FIG. 13 and FIG. 15 above. FIG. 15 above illustrates one example of a concrete apparatus structure of FIG. 17. Other various structures may be implemented to realize one or more of the functions of FIG. 3, FIG. 5, FIG. 13 and FIG. 15. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An evolved Node B (eNB) for special subframe configuration for carrier aggregation, comprising:
   a processor;
   memory in electronic communication with the processor, wherein instructions stored in the memory are executable to:
      determine whether a user equipment (UE) is capable of simultaneous reception and transmission in aggregated cells; and
      jointly determine the special subframe configurations of the aggregated cells;
   wherein a guard period is extended on at least one of the aggregated cells if there are UEs that are not capable of simultaneous reception and transmission in the aggregated cells, and wherein the guard period is extended such that the guard period has an overlap that is greater than a sum of a cell switching time and a processing time.

2. An evolved Node B (eNB) for special subframe configuration for carrier aggregation, comprising:
   a processor;
   memory in electronic communication with the processor, wherein instructions stored in the memory are executable to:
      determine whether a user equipment (UE) is capable of simultaneous reception and transmission in aggregated cells; and
      jointly determine the special subframe configurations of the aggregated cells;
   wherein a guard period is extended on at least one of the aggregated cells if there are UEs that are not capable of simultaneous reception and transmission in the aggregated cells, and wherein the guard period is extended such that an effective guard period has an overlap that is greater than a sum of a cell switching time and a processing time.

3. An evolved Node B (eNB) for special subframe configuration for carrier aggregation, comprising:
   a processor;
   memory in electronic communication with the processor, wherein instructions stored in the memory are executable to:
      determine whether a user equipment (UE) is capable of simultaneous reception and transmission in aggregated cells;
      determine a timing advance for each of the aggregated cells;
      jointly determine the special subframe configurations of the aggregated cells; and
      extend a guard period such that the guard period is greater than a maximum timing advance of at least one cell, a maximum propagation delay of at least one cell, a maximum cell switching period of at least one cell and a maximum processing time of at least one cell.

4. A method for special subframe configuration for carrier aggregation by an evolved Node B (eNB), comprising:
   determining whether a user equipment (UE) is capable of simultaneous reception and transmission in aggregated cells; and
   jointly determining the special subframe configurations of the aggregated cells;

wherein a guard period is extended on at least one of the aggregated cells if there are UEs that are not capable of simultaneous reception and transmission in the aggregated cells, and wherein the guard period is extended such that the guard period has an overlap that is greater than a sum of a cell switching time and a processing time.

5. A method for special subframe configuration for carrier aggregation by an evolved Node B (eNB), comprising:
- determining whether a user equipment (UE) is capable of simultaneous reception and transmission in aggregated cells; and
- jointly determining the special subframe configurations of the aggregated cells;
- wherein a guard period is extended on at least one of the aggregated cells if there are UEs that are not capable of simultaneous reception and transmission in the aggregated cells, and wherein the guard period is extended such that an effective guard period has an overlap that is greater than a sum of a cell switching time and a processing time.

6. A method for special subframe configuration for carrier aggregation by an evolved Node B (eNB), comprising:
- determining whether a user equipment (UE) is capable of simultaneous reception and transmission in aggregated cells;
- determining a timing advance for each of the aggregated cells;
- jointly determining the special subframe configurations of the aggregated cells; and
- extending a guard period such that the guard period is greater than a maximum timing advance of at least one cell, a maximum propagation delay of at least one cell, a maximum cell switching period of at least one cell and a maximum processing time of at least one cell.

* * * * *